United States Patent [19]

Quesinberry et al.

[11] 4,179,696
[45] Dec. 18, 1979

[54] KALMAN ESTIMATOR TRACKING SYSTEM

[75] Inventors: Elmen C. Quesinberry, Severna Park; Michael Tom, Glen Burnie; James L. Farrell, Baltimore, all of Md.

[73] Assignee: Westinghouse Electric Corp., Pittsburgh, Pa.

[21] Appl. No.: 800,121

[22] Filed: May 24, 1977

[51] Int. Cl.² ............................ G01S 9/22; G01S 9/44
[52] U.S. Cl. .................................... 343/7.4; 343/9 R; 343/16 M; 235/412; 235/413
[58] Field of Search ................. 343/16 M, 7.4, 5 DP, 343/9; 235/411, 412, 413

[56] References Cited

U.S. PATENT DOCUMENTS

| 3,821,738 | 6/1974 | Quesinberry et al. | 343/16 M |
| 3,952,304 | 4/1976 | Broniwitz et al. | 343/16 M |
| 4,004,729 | 1/1977 | Rawicz et al. | 235/411 |
| 4,128,837 | 12/1978 | Page | 235/412 |

Primary Examiner—Maynard R. Wilbur
Assistant Examiner—Lawrence Goodwin
Attorney, Agent, or Firm—H. W. Patterson

[57] ABSTRACT

A radar tracking system having a Kalman estimator is disclosed. The estimator is provided with angle and range track error measurements in a coordinate system that is aligned with and normal to the antenna line of sight, commonly referred to as the LOS coordinate system. This estimator implementation uses less computing resources in converting the measurements provided relative to the antenna LOS coordinate system, to predict target position referenced to a stable coordinate system such as geographic, wander azimuth, or inertial.

6 Claims, 15 Drawing Figures

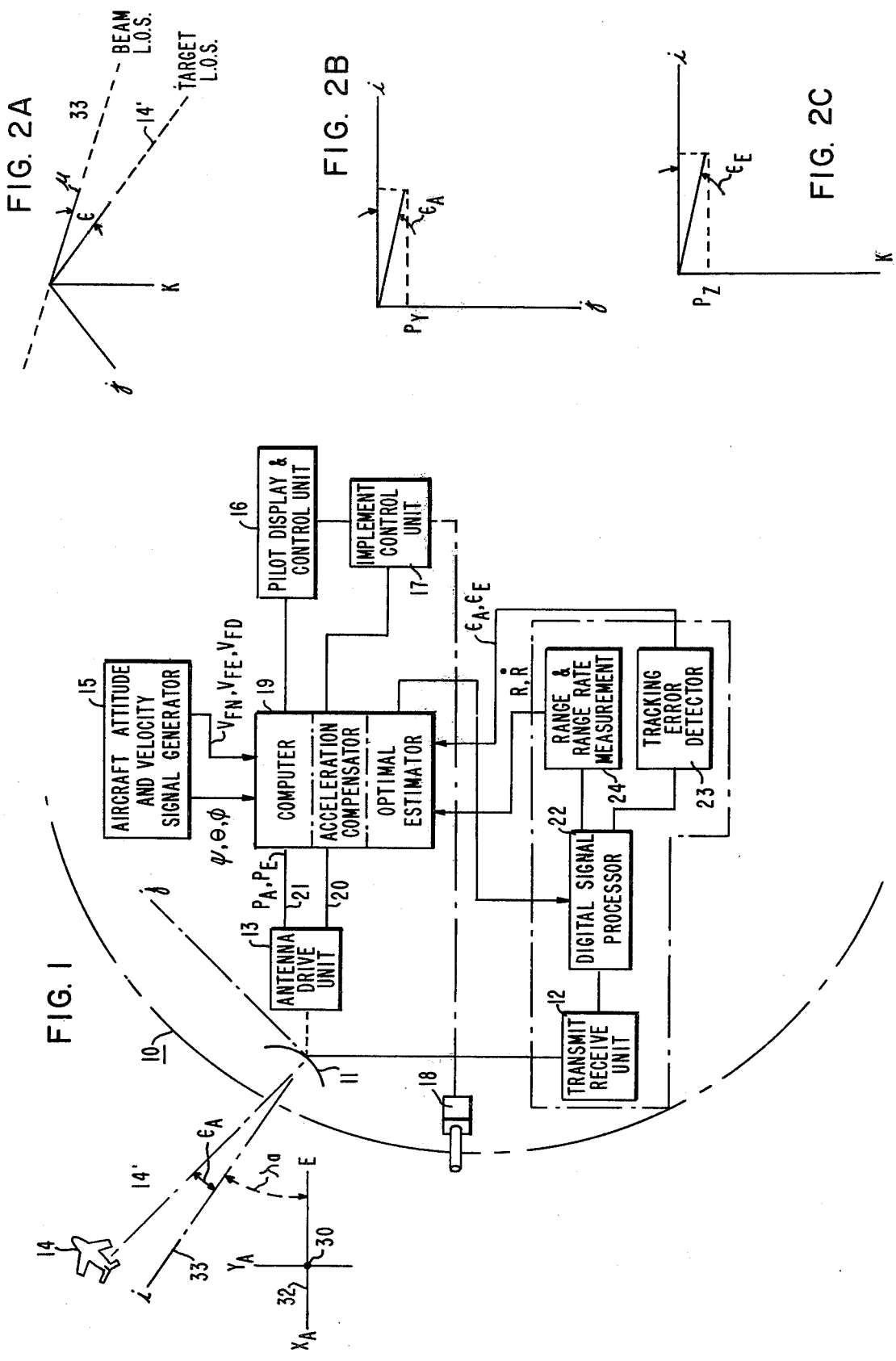

KALMAN ESTIMATOR TRACKING SYSTEM

GOVERNMENT CONTRACT

The invention described herein was made in the course of, or under, Contract No. F33657-75-C-310 with the Department of the Air Force.

CROSS-REFERENCE TO RELATED APPLICATION

Reference is made to copending application Ser. No. 731,872 filed Oct. 13, 1976, by E. C. Quesinberry, and assigned to the present assignee entitled "Improved System For Estimating Acceleration Of Maneuvering Targets", which is directed towards the method and system of acceleration compensation for maneuvering targets.

BACKGROUND OF THE INVENTION

1. Field of the Invention

The present invention relates to target tracking systems; and more particularly to an improved Kalman estimator system for predicting the position of moving targets.

2. Description of the Prior Art

In a typical radar tracking system, pulses are transmitted through an antenna at a predetermined repetition rate towards a target. The target reflects the pulses back to the antenna. The time of reception and the doppler shift of the pulses, together with the pointing angles of the airborne antenna, the time history of angular orientation and of the velocity vector of the tracking aircraft are processed by a signal processor to generate signals that represent range, radial velocity or range rate, and the elevation and azimuth angles to the target.

In the mechanization of such a system, a high speed digital computer may be used that operates upon the measured input signals every two hundredths of a second, for example. The range measurement signals may be read by the computer every four hundredths of a second, and the angle measurements may be calculated every four hundredths of a second during alternate cycles of calculation. The results of each calculation may be output to the antenna once every five thousandths of a second for controlling the antenna position to track the target.

From the input information, estimates or predictions of target position are generated at predetermined fractions of a second; and such target position estimation signals are calculated from the last estimated position, target velocity, and target acceleration estimation signals, and are utilized to point the antenna at the moving target; and, also may be utilized to control the pointing of an implement at the target, if desired. An optimal estimating system that is well suited for program implementation in a high speed digital computer is the estimator known as a Kalman filter. The Kalman filter is well known in the literature and may be defined as an optimal recursive filter that is based on space and time domain formulations.

Briefly, such a Kalman filter or estimator processes the measured information concerning moving targets such as range, radial velocity, elevation, and azimuth to develop signals that represent estimates of target relative position, target relative velocity and target acceleration. An additional set of parameters is developed representing the uncertainty in the estimation of target position and its time derivatives (rates of change with respect to time). The elements of this set of parameters are called the error covariances of the estimation model. A second set of error covariances represents the mean squared error in measurement of range, radial velocity, azimuth and elevation. Any difference between a predicted value of an estimated quantity and its measured value is commonly called a residual. This residual is composed of errors in estimation and errors in measurement. Obviously, not all of an observed residual should be used to correct errors in estimation, since the residual contains measurement errors. A Kalman gain factor is formulated which seeks to take that fraction of a residual which is due to estimation error alone. This fraction of the residual is then used to revise the estimation model after each observation, or measurement. The revised estimates are then used to predict the result of the next measurement, and the process is repeated.

The measured quantities as well as the quantities for predicting the position of the target must be referenced to a coordinate system. For example, a geographic coordinate system extends along north, east, and down axes (NED) respectively, or a line-of-sight (LOS) or antenna coordinate system, which extends along three axes, the direction that the antenna is pointing (i), orthogonally to the right of te antenna (j), and downward from such direction (k). A further coordinate system is referred to as an aircraft coordinate system which extends along dead ahead, right, and down axes (XYZ) from the nose of the aircraft, respectively. These coordinate systems may be utilized in the tracking operation of the antenna and the pointing of an implement at a target. For example, signals may be generated that are representative of the attitude of the aircraft relative to the horizon; that is, nose up or nose down, as well as signals representative of the velocity of the aircraft. These signals, as well as tracking error signals of the antenna, are input to and operated upon by the digital computer to calculate the various output signals for positioning the antenna to maintain its track on the target.

The use of a stable (e.g., geographic) coordinate system as a reference frame allows the formulation of a linear dynamic model. This results in the simplest sequence of calculations while inherently providing more accurate predictions of target position, velocity and acceleration. Also, with availability of measured attitude with respect to the stable reference, rate gyros are not required to measure its time rate of change of orientation. Measured quantities such as range, range rate and elevation and azimuth angles are interdependent when calculating target position, velocity and acceleration. Thus, for n interdependent parameters there would be $n \times n$ sets of calculations involved in the direct generation of the Kalman gain factors. For the three spatial components (north, east and down) of target position, velocity and acceleration, n equal nine.

In the line-of-sight (LOS) coordinate system, the measured quantities range, range rate and azimuth and elevation angles are independent of each other. The Kalman gain computations are greatly simplified; and the number of such computations are greatly reduced. If the radar beam shape is the same in azimuth and elevation, the number of computations is further reduced. However, the orientation of the LOS system moves with time as the antenna-carrying aircraft moves in three-dimensional space. In conventional systems, formulated wholly within the LOS coordinate system, this change in the LOS orientation customarily employs rate gyros to measure the reorientation and results in a nonlinear system model to predict the target's position, velocity and acceleration. The nonlinear system models require more complex computations involving complicated weighting factors to predict target position, velocity and acceleration.

Thus, it is desirable to provide an improved system utilizing a Kalman estimator that has the advantages of both a stable and a line-of-sight coordinate system without the inherent disadvantages of either.

SUMMARY OF THE INVENTION

In accordance with the present invention, an airborne radar tracking system utilizing a Kalman estimator is provided wherein computer memory and operations for performing the update cycle are minimized. Such a system provides for the application of similarity transformations to covariance matrix transformations. Both the time extrapolation and the decrementing can be performed using elements as defined in the line-of-sight reference of an aircraft antenna. In effect, the similarity transformation then provides the elements needed for updating each estimate in the stable reference frame. Such a system benefits from both the linearity of the stable coordinate reference and the efficiency of covariance propagation in the line-of-sight reference system.

In one embodiment, the measurements of range and angle residuals, azimuth residuals and elevation residuals are transformed to the geographic coordinate system by characterizing such measurements with five known angles. Such angles may include the aircraft heading, pitch, roll, and two radar gimbal angles.

BRIEF DESCRIPTION OF THE DRAWINGS

FIG. 1 is a schematic overall block diagram of a radar system according to one embodiment of the present invention;

FIGS. 2A–2C are diagrams illustrating the relationships between beam and target lines of sight of the system of FIG. 1;

DESCRIPTION OF THE PREFERRED EMBODIMENT

Figure 3:
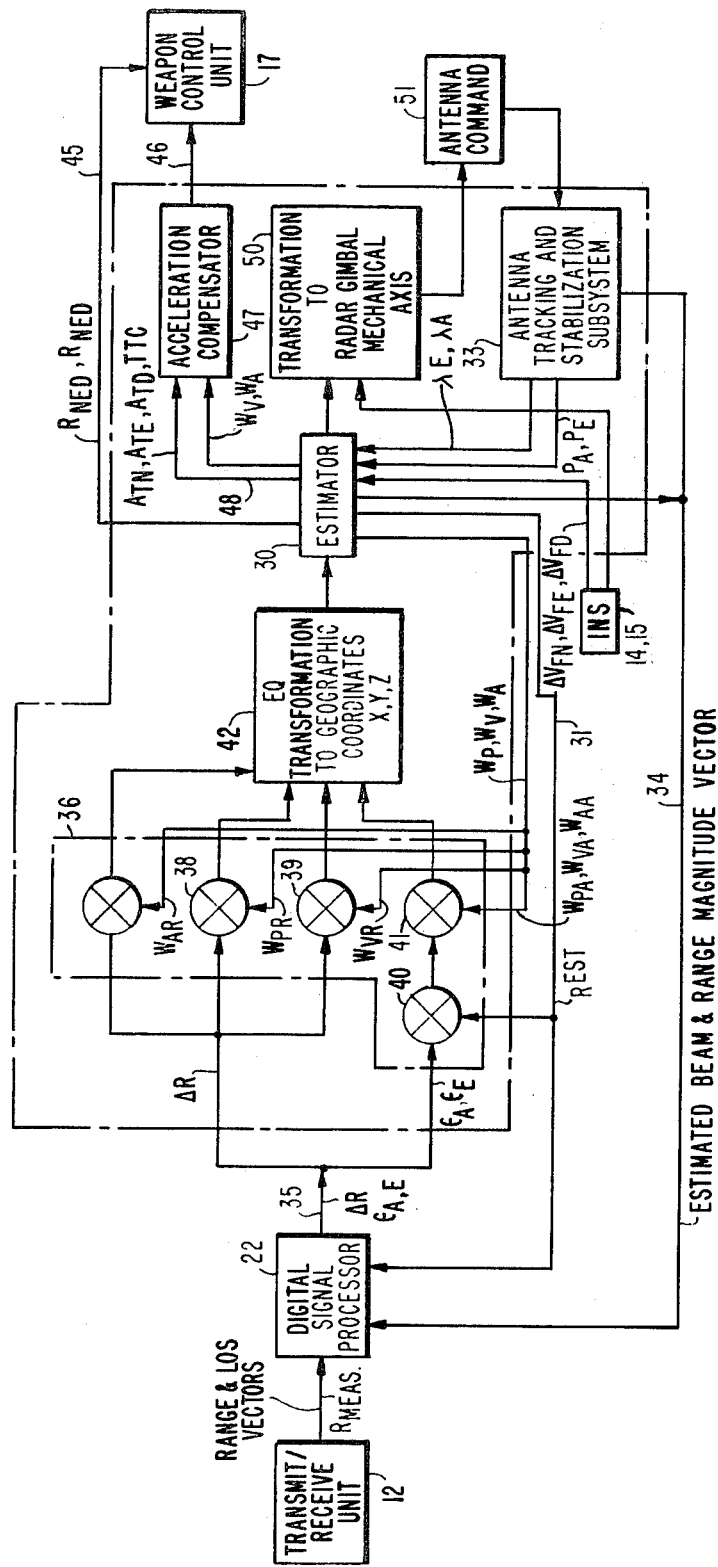
FIG. 3 is a schematic block diagram to illustrate in more detail the transformation between LOS and geographic coordinate systems.

A radar system operable in accordance with the present invention is illustrated in FIG. 1. Since the invention has particular utility in the environment of an airborne radar system, the illustrated embodiment is shown in FIG. 1 in this environment in the forward portion of an aircraft 10 and is described hereinafter in this connection. It should, however, be understood that the invention is not limited to this application.

Referring to FIG. 1, the system generally includes an antenna assembly 11 (mounted on an aircraft 10), a suitable conventional transmit receive unit 12, a suitable conventional antenna drive unit 13, a suitable source 15 of data representing aircraft attitude and velocity vector, a suitable conventional pilot display and control unit 16, and a control unit 17 that controls the pointing of a device referred to as 18 that is required to be pointed toward the target 14.

The antenna 11 is mounted on gimbals (not shown) so that it can be driven in two or three axes of the antenna so that it can be driven in two or three axes of the antenna coordinate system by the antenna drive unit 13. For three-axis motion, the gimbals permit rotation of the antenna (1) in the azimuth plane about an azimuth gimbal axis which is directed downward (2) in the elevation plane about an elevation gimbal axis which rotates with (k) the azimuth gimbal and extends parallel to a line (i) from wing tip to wing tip when all gimbal angles are zero, and (3) in some instances about a roll gimbal axis usually parallel to the aircraft longitudinal axis. The order of operation of the azimuth, vertical, or roll axis, for changing the antenna position is arbitrary; and in some applications, the roll axis is not included in the system.

The antenna drive unit 13 responds to three signals for operating the radar gimbal mechanical axis (RGMA) system of the antenna drive unit 13, which signals may correspond to the direction cosines of the line of sight (LOS) vectors for the three RGMA axes, which are commonly referred to as 1, m and n. These signals are generated by a computer 19 to drive the unit 13 over a line 20. The actual position of the antenna is fed back to the computer 19 over a line 21.

The transmit receive unit 12 provides the radar pulses to the antenna 11 and receives the echoes detected by the antenna 11. The echo signals are converted to digital form and transmitted to a convention digital signal processor 22. The digital processor 22 provides information to the computer 19 through a tracking error detector portion 23, which outputs a signal corresponding to an azimuth tracking error ($\epsilon_A$) of the antenna and a signal corresponding to an elevation tracking error ($\epsilon_E$) of the antenna with respect to the target 14. The digital signal processor 22 also provides information through a suitable conventional range and range rate measurement detector portion 24, which outputs signals to the computer 19 corresponding to the range (R) and the rate of change of the range ($\dot{R}$) of the target 14, for example.

The computer 19 is mechanized to include an optimal estimator portion, of the type referred as a Kalman estimator, and a final value or acceleration compensator portion, which modifies the estimated target acceleration signal in order to more accurately position the unit 18 for pointing at severely maneuvering targets.

In addition to the signals R, $\dot{R}$, $\epsilon_E$ and $\epsilon_A$ representing range, range rate, elevation error, and azimuth error respectively, the computer 19 also receives aircraft attitude and velocity vector data. The source 15 of this data may be (but is not restricted to) a locally slaved inertial platform which provides an angle psi ($\psi$) expressing the heading of the aircraft, a second angle theta ($\theta$) corresponding to the pitch attitude, and a third angle phi ($\phi$) corresponding to the roll attitude of the aircraft. This attitude information is measured in angles relative to a geographic coordinate system, and the coordinates are denoted herein by N, E and D.

These reference directions are used to define the components of interceptor velocity ($V_{FN}$, $V_{FE}$, $V_{FD}$), also obtained from the platform or other alternate source 15 of interceptor motion data. The computer 19 takes this information into account, as necessary, in controlling (1) the direction of the antenna 11, (2) the operation of the pilot display and control unit 16, and (3) the control unit 17.

To facilitate the description hereinafter, the aircraft may be assumed to have orthogonal axes of rotation in azimuth and elevation generally indicated respectively at 30 (projecting into the paper) and 32 normal thereto. The aircraft roll axis corresponds to the longitudinal axis 32 of the aircraft. A right-hand, three-dimensional aircraft coordinate system having axes $X_A$ and $Y_A$ as shown in FIG. 1 and a third axis $Z_A$ (positive in a direction into the paper) may be set up to define, as shown in FIG. 1, the aircraft attitude relative to a selected right-hand, three-dimensional stable coordinate system (e.g., geographic, with axes north (N), east (E) and down (D)). Although the system is described relative to a geographic coordinate system, it is understood that any stable coordinate system, such as wander azimuth or inertial may be substituted therefor.

Likewise, the attitude of the aircraft 10 in azimuth relative to a selected fixed coordinate system may be defined in any suitable conventional manner as, for example, the angle ($\psi$) psi between the axis 32 ($X_A$) and the X-axis of the selected coordinate system, e.g., north in any geographic system, measured in the X-Y plane or north-east plane of the fixed coordinate system. The attitude of the aircraft in elevation relative to the fixed coordinate system may be defined in any suitable conventional manner as, for example, the angle ($\theta$) theta between the aircraft axis 32 ($X_A$) and the X-Y plane measured in the $X_A$-Z plane. Finally, the aircraft roll angle relative to the fixed coordinate system may also be defined in any suitable conventional manner as, for example, the angle ($\phi$) phi measured clockwise about the aircraft axis $X_A$ from the X-Y plane to the $Y_A$ axis.

With continued reference to FIG. 1, assuming that a portion of the beam strikes the target 14, energy is reflected to the antenna 11 and is directed to the receiver portion of the transmitter receiver unit 12. The tracking error detector 23 then utilizes the signal reflected from the target 14 to generate azimuth an elevation angle tracking errors $\epsilon_A$ and $\epsilon_E$, respectively. The quantities $\epsilon_A$ and $\epsilon_E$ represent the angular error between the axis 33 of the transmitted beam and the line of sight 14' to the target 14. The error signals $\epsilon_A$ and $\epsilon_E$ may then be applied to the computer 19 which controls the antenna drive unit 13 to position the antenna 11 in azimuth and elevation, respectively, such that the angular azimuth and elevation errors between the beam axis 33 and the target line of sight 14' are nulled.

The generation of the error signals $\epsilon_A$ and $\epsilon_E$ by the tracking error detector 23 and the quantities which these signals represent are described hereafter in connection with FIGS. 2A-2C. The actual detected error tracking signals $\epsilon_A$ and $\epsilon_E$ thus represent angular tracking errors. For example, as is illustrated in FIGS. 2A-2C, a right-hand, three-dimensional line of sight or antenna coordinate system having orthogonal axes i, j, and k may be established with the axis i corresponding to the beam line of sight 33. In the situation in which the beam line of sight 33 and the target line of sight 14 coincide, there is no tracking error and the direction to the target may be represented by a unit vector u (i.e. a vector u of length 1) coincident with the beam line of sight 33. The unit vector u has components $u_i$, $u_j$, and $u_k$, which, with no tracking error, are given as direction cosines 1,0,0 (the 1 representing the length of the projection of the vector onto the i axis, and the O's representing the lengths of the projections of the vector onto the j and k axes, respectively. If, on the other hand, the target line of sight 14' is displaced by an angle $\epsilon$ from the beam line of sight 33, the unit vector u representing the line of sight to the target is displaced from the i axis by the angle $\epsilon$. This angle $\epsilon$ has a component $\epsilon_A$ in the horizontal or azimuth plane defined by the axes i and j (FIG. 2B). These components $\epsilon_A$ and $\epsilon_E$ represent the respective azimuth and elevation angular errors between the target and beam lines of sight and correspond to the signals $\epsilon_A$ and $\epsilon_E$ generated as tracking error signals.

It may be validly assumed that the azimuth and elevation error signals $\epsilon_A$ and $\epsilon_E$ in the respective azimuth and elevation planes are very small angular quantities when the system is placed in track mode. Thus in both the azimuth and elevation, line-of-sight planes as shown in FIGS. 2B and 2C, respectively, the projections of the unit vector u onto the i-axis is approximately equal to the unit vector length, i.e., approximately equal to 1. The projection of the unit vector u onto the j-axis is equal to (Sine $\epsilon_A$ Cos $\epsilon_E$) which, for small angles, is approximately equal to $\epsilon_A$. Likewise, the projection of the elevation angle $\epsilon_E$ onto the k-axis is approximately equal to the angle $-\epsilon_E$ for small angles (the minus sign counting for the downward direction of the k-axis). Thus, the respective azimuth and elevation angle tracking error signals may be used to represent the deviation of the unit vector u from the zero tracking error position, i.e., to represent the direction cosine errors, with respect to the beam line-of-sight, of a unit vector pointing along the target line-of-sight. When the beam line-of-sight 33 is aligned with the line-of-sight 14' to the target, the unit vector may be represented by its projections along the line-of-sight axes i, j and k by the quantities 1,0,0 respectively. In the event that the beam and target lines of sight are not aligned, the change in the i projection is negligible in track mode so this change or deviation of the i projection from the zero track error position is assumed to be zero. The deviations of the j and k projections (initially zero with no tracking error) are approximately equal to the angle tracking errors $\epsilon_A$ and $\epsilon_E$, respectively. Thus, these derivations along the axes i, j and k may be represented by the quantity O, $\epsilon_A$ and $-\epsilon_E$, respectively. Reference is made to U.S. Pat. 3,821,738 issued June 28, 1974 for a more detailed understanding of that portion of the radar system concerned with positioning a radar antenna without rate gyros.

Referring to FIG. 3, the overall organization of the system is shown wherein the transit-receive unit 12 outputs information relating to the range and line-of-sight vectors to the digital signal processor 22. Also, the range that is measured by the transmit-receive unit is input to the digital signal processor and is referred to as $R_M$. Additionally, an estimator 30 outputs to the digital signal processor over line 31, the estimated range $R^{EST}$ to the processor 22. Antenna tracking and stabilization subsystem referred to at 33 and the estimator 30 output information relating to the estimated beam and range magnitude vector over line 34 to the processor 22. The digital signal processor 22 outputs a value corresponding to the target range residual $\Delta R$; which is in fact the range error between the actual last measured range $R_M$ and the estimated range magnitude vector. Also output from the unit 22 is the angle error in azimuth and elevation $\epsilon_A$ and $\epsilon_E$ as shown on line 35 to the input of an estimator gain factor multiplier 36. Also input to the multiplier 36 is the estimated range $R^{EST}$ and estimator gain factors, referred to as $W_P$, $W_V$, and $W_A$ which are the gains corresponding to position, velocity and acceleration from the estimator 30. The range error or residual $\Delta R$ is multiplied by the estimator gains $W_P$, $W_V$ and $W_A$ in multiplying devices 38 and 39 respectively. The angle errors or residuals $\epsilon_A$ and $\epsilon_E$ are multiplied by the estimated range $R^{EST}$ by multiplying device 40. The products from the multiplier 40 are then multiplied by the estimator gain factors $W_P$, $W_V$, and $W_A$ in device 41 of the estimator gain factor multiplier 36. The products of the aforementioned calculations are input to the portion of the system for transformation of the information to the geographic coordinates N, E and D referred to in block 42. Thus, the residuals are multiplied by their respective estimator gain factors and transformed from the line-of-sight, i, j and k to geographic coordinates N, E and D by a transformation unit 42 which may be formed of transformation matrices. The output from the transformation matrices or unit 42 is input to the estimator 30 which will be described in more detail hereinafter. Also input to the estimator 30 are values corresponding to ownship velocity change, since the last estimator step, along north, east and down coordinates referred to as $\Delta V_{FN}$, $\Delta V_{FE}$, and $\Delta V_{FD}$ respectively. In the event that the antenna is not aligned with the commanded position, errors $P_A$ and $P_E$ are input to the estimator 30 from the antenna tracking and stabilization subsystem 33. The implement control unit 17 receives as its input the estimated range $R_N$, $R_E$, and $R_D$ and the estimated range rate $\dot{R}_N$, $\dot{R}_E$, $\dot{R}_D$ as shown on a line 45. The other input on line 46 is output from an acceleration compensator 47 hereinafter described, the inputs to which constitute the target time constant TTC, the estimated acceleration $A_{TN}$, $A_{TE}$, and $A_{TD}$ over a line 48 and the estimator gain factors for velocity and acceleration $W_V$, and $W_A$, respectively. The estimator outputs are also transformed to the radar gimbal mechanical axis coordinates as shown by block 50; which in turn provides the outputs for commanding the antenna at block 51. The antenna tracking and stabilization subsystem outputs the $\lambda_E$ and $\lambda_A$ values of antenna gimbal angles and also the antenna position error angles $P_E$, $P_A$ for input for the estimator. The estimated beam and magnitude vectors to the input of the digital signal processor are supplied by processing the stabilization subsystem and the estimator outputs.

Figure 4:
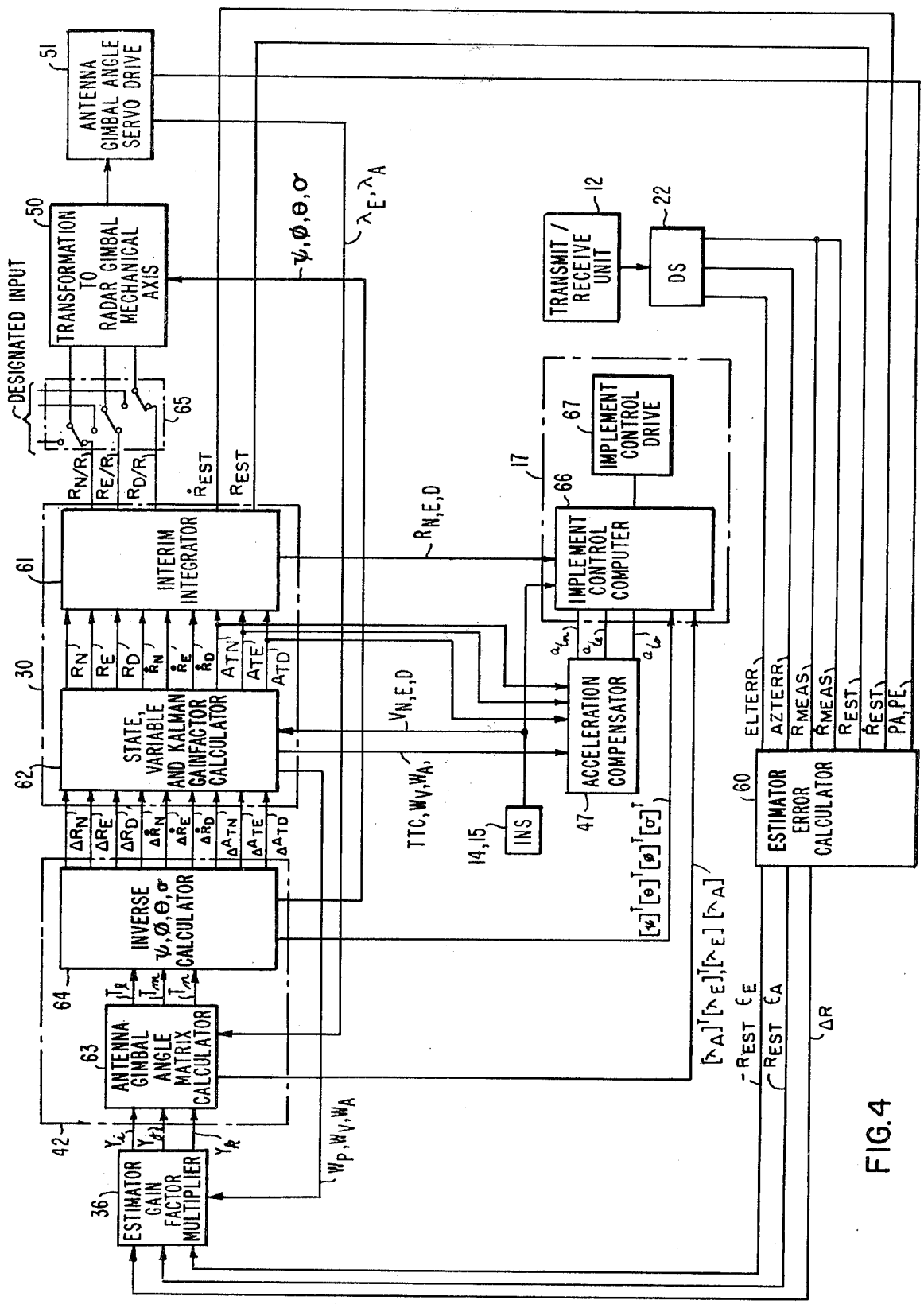
FIG. 4 is a functional block diagram to illustrate in still more detail the organization of the system of FIG. 3.

Referring to FIG. 4, for a more detailed explanation of the system; and as mentioned in FIG. 1, the digital signal processor 22 during each calculation cycle interprets the return signals from the target 14 to determine the range ($R_M$) and the rate of change of the range ($\dot{R}_M$) and the angle error of the target in azimuth and elevation (AZTERR) and (ELTERR) relative to the antenna coordinates, respectively. An estimator error calculator referred to at 60 receives the values ELTERR, AZTERR, $R_M$, and $\dot{R}_M$ from the DSP 22 together with the estimated range and range rate of the target $R_{EST}$ and $\dot{R}_{EST}$ from the output of an interim integrator 61 hereinafter described. The unit 61 extrapolates the estimated values for commanding the antenna between calculations. Also, the estimator error calculator 60 receives error signals from the servo following system 51 in azimuth and elevation ($P_A$ and $P_E$) respectively. The estimator error calculator 60 processes the incoming information by subtracting the estimating range $R_{EST}$ from the measured range $R_M$; subtracting the servo following error in azimuth $P_A$ from the elevation angle track error AZTERR, and subtracting the servo following error in elevation $P_E$ from the elevation angle track error ELTERR. The result of the subtraction of the errors $P_A$ and $P_E$ are the values $\epsilon_A$ and $68_E$ which correspond to the angle of target error from the line of sight 33 (FIG. 1) in azimuth and elevation, respectively. Thus, the error calculator 60 removes all errors such as may be caused by the antenna mechanism so that the errors at the output of the unit 60 for input to the multiplier 36 are only those errors caused by the estimator 30 itself. These estimator errors, that is, the error between the last calculated output of the interim integrator 61 and the measured output received from the digital signal processor 22 are then multiplied by the estimator gain factors (sometimes referred to as Kalman factors) by the multiplier 36 are described in connection with FIG. 3. The Kalman gains $W_P$, $W_V$, and $W_A$ which correspond to gains for position, velocity and acceleration of the target respectively are weighting factors which are applied to the measured errors with the realization that such measured errors from the error calculator 60 may not be accurate. This inaccuracy typically is due to noise or other system errors. Thus, the signals at the output of the multiplier 36 which are weighted by the Kalman gains from the state variable and Kalman gain factor calculator 62 are referred to as $y_i$, $y_j$ and $y_k$ and represent the estimated error derived from the last measured value of target angle error in azimuth and elevation ($\epsilon_A$, $\epsilon_E$) and the range error $\Delta R$, respectively. These errors are input to an antenna gimbal angle matrix calculator 63 for correction of any deviation caused by previous movement of the antenna which may exist between the angles of the antenna gimbals and the aircraft coordinate system. To transform the weighted errors corresponding to the angle error of the target from the line of sight of the antenna coordinate system and the range error relative to such coordinate system to errors which are calculated relative to the geographic system by an inverse calculator 64, it is necessary that the transformation quantities derived from the angles of the antenna gimbals from the aircraft coordinate system, referred to as $\lambda_A$ and $\lambda_E$ must be multiplied by the corrected errors $y_i$, $y_j$ and $y_k$ respectively. This is accomplished separately from the remainder of the calculations in transforming from an aircraft coordinate system to a geographic coordinate system because it may differ for different types of radar installations. In the calculator 63, a matrix of sines and cosines of the angles $\lambda_E$ and $\lambda_A$ is formed and is multiplied by the input errors from the multiplier 36. Thus, at the output of the calculator 63 are error signals that have been calculated relative to the RGMA coordinate system heretofore mentioned and are referred to as $T_l$, $T_m$, and $T_n$. The RGMA coordinate system (l, m, n) is coincident with the aircraft coordinate system (X, Y, Z) if the misalignment angle $\sigma$ is zero. These signals are input to the inverse calculator 64 for transforming each type of angle that lies between the aircraft coordinate system and the geographic system. Such calculator is referred to as inverse because, for noninverse transformations, the angle matrices that are defined with sines and cosines are in an array such that the calculations are made for angular rotations clockwise about the geographic axis with which the angle is concerned. The angle $\phi$ is measured about the longitudinal axis of the aircraft and is sensed as clockwise when facing forward toward the nose when the right wing tip is moving down. The angle $\sigma$ is measured clockwise about an axis parallel to a line from wing tip to wing tip when at the center of the coordinate system facing toward the right wing. In the event that an observer measures in a counterclockwise rotation, for example, a sequence of counterclockwise measurements $\sigma$, $\phi$, $\theta$, $\psi$, respectively, the symbols would be represented by $\psi^T$, $\theta^T$, $\phi^T$ and $\sigma^T$. The first calculation in the calculator 64 is the $\sigma$ calculation that corresponds to the angle of alignment of the antenna relative to the aircraft longitudinal axis, which is the angle of alignment of the antenna relative to the aircraft coordinate system. The $\sigma$ calculation may or may not be necessary if the antenna gimbals are aligned with the aircraft coordinate system. Thus, coming out of the calculator 64 are error signals calculated with respect to the geographic coordinate system. For example, $\Delta R_N$, $\Delta R_E$, and $\Delta R_D$ are the three range errors relative to the north, east and down axes of the geographic coordinate system. The errors $\Delta \dot{R}_E$, $\Delta \dot{R}_D$, and $\Delta \dot{R}_N$ are all errors relating the rate of change of the range vector projecting along the east, down, and north axes of the geographic coordinate system respectively. The errors $\Delta AT_N$, $\Delta AT_E$, and $\Delta AT_D$, are all acceleration errors of the target measured relative to the north, east and down axes of the geographic coordinate system. These errors $\Delta R$, $\Delta \dot{R}$ and $\Delta AT$ each have three components, previously mentioned and are input to the state variable and Kalman-gain-factor calculator 62, together with ownship velocity relative to geographic coordinates referred to as $V_{N,E,D}$ from the inertial navigation system made up of the components 15 (FIG. 1).

These error signals are made up of various components, and are calculated as follows:

| | |
|---|---|
| $\Delta S_1 = \Delta R_N =$ | the component of $(W_{pi})$ ($\Delta$ R) along the N direction |
| | + the component of $(W_{pj})$ (Rest) $(E_A)$ along the N direction |
| | + the component of $(W_{pk})$ (Rest) $(-E_E)$ along N direction. |
| $\Delta S_2 = \Delta R_E =$ | the component of $(W_{pi})$ ($\Delta$ R) along the E direction |
| | + the component of $(W_{pj})$ (Rest) $(E_A)$ along the E direction |
| | + the component of $(W_{pk})$ (Rest) $(-E_E)$ along E direction. |
| $\Delta S_3 = \Delta R_D =$ | the component of $(W_{pi})$ ($\Delta$ R) along the D (down) direction |
| | + the component of $(W_{pj})$ (Rest) $(E_A)$ along the D direction |
| | + the component of $(W_{pk})$ (Rest) $(-E_E)$ along the D direction. |
| $\Delta S_4 = \Delta \dot{R}_N =$ | the component of $(W_{vi})$ ($\Delta$ R) along the N direction |
| | + the component of $(W_{vj})$ (Rest) $(E_A)$ along the N direction |
| | + the component of $(W_{vk})$ (Rest) $(-E_E)$ along N direction. |
| $\Delta S_5 = \Delta \dot{R}_E =$ | the component of $(W_{vi})$ ($\Delta$ R) along the E direction |
| | + the component of $(W_{vj})$ (Rest) $(E_A)$ along the E direction |
| | + the component of $(W_{vk})$ (Rest) $(-E_E)$ along the E direction. |
| $\Delta S_6 = \Delta \dot{R}_D =$ | the component of $(W_{vi})$ ($\Delta$ R) along the D (down) direction |
| | + the component of $(W_{vj})$ (Rest) $(E_A)$ along the D direction |
| | + the component of $(W_{vk})$ (Rest) $(-E_E)$ along the D direction. |
| $\Delta S_7 = \Delta AT_N =$ | the component of $(W_{ai})$ ($\Delta$ R) along the N direction |
| | + the component of $(W_{aj})$ (Rest) $(E_A)$ along the N direction |
| | + the component of $(W_{ak})$ (Rest) $(-E_E)$ along the N direction. |
| $\Delta S_8 = \Delta AT_E =$ | the component of $(W_{ai})$ ($\Delta$ R) along the E direction |
| | + the component of $(W_{aj})$ (Rest) $(E_A)$ along the E direction |
| | + the component of $(W_{ak})$ (Rest) $(-E_E)$ along the E direction. |
| $\Delta S_9 = \Delta AT_D =$ | the component of $(W_{ai})$ ($\Delta$ R) along the D (down) direction |
| | + the component of $(W_{aj})$ (Rest) $(E_A)$ along the D direction |
| | + the component of $(W_{ak})$ (Rest) $(-E_E)$ along the D direction. |
| $P_A =$ | the component of $R_N/R$ along the antenna j-axis |
| | + the component of $R_E/R$ along the antenna j-axis |
| | + the component of $R_D/R$ along the antenna j-axis |
| $-P_E =$ | the component of $R_N/R$ along the antenna k-axis |
| | + the component of $R_E/R$ along the antenna k-axis |
| | + the component of $R_D/R$ along the antenna K-axis. |

The unit 62 estimates the range, range rate, and acceleration of the target every 0.02 of a second, with the actual calculation of each new range and range rate occurring on alternate cycles every 0.04 of a second, for example. This information is input to the previously mentioned interim integrator 61 which extrapolates the estimated information between calculations and performs other trigonometric functions to output the estimated cosine of the range vector along the north axis $R_N/R$, along the east axis $R_E/R$, and along the down axis $R_D/R$ of the geographic coordinate system. This information is conducted through a switch 65 which is either in the designate or search mode or in the antenna tracking mode, as shown in the drawing, to input the information every 0.005 of a second for calculation with the heading of the ownship, the climb or dive, the roll, and the alignment of the antenna relative to the geographic axis for transforming the estimated data from the geographic coordinate system to the radar gimbal mechanical axis in the unit 50. As heretofore mentioned, the unit 61 also outputs the estimated range $R_{EST}$ and range rate $\dot{R}_{EST}$ for determining the input to the unit 60 for subsequently calculating the errors, $y_i$, $y_j$ and $y_k$ which are the result of multiplying unit 60 outputs by the respective gain factors calculated with reference to the line-of-sight or antenna coordinate system.

The implement control system 17 (FIG. 1) includes a weapon control computer referred to at 66 which provides the output signals for driving an implement control drive unit 67. The implement control computer receives data from the acceleration compensator 47 relating to the acceleration of the target along the north, east and down geographic coordinates referred to as $AT_N$, $AT_E$, and $AT_D$, respectively. It also receives information relating to the estimated range and rate of range of the target relative to the geographic coordinates referred to as $R_{N,E,D}$ and $\dot{R}_{N,E,D}$, respectively. Additionally, the computer 66 receives information during each calculation from the antenna gimbal angle matrix calculator 63 relating to $[\lambda_A]^T[\lambda_E]^T$, and $[\lambda_E][\lambda_A]$, which terms correspond to information relating to the inverse transformation and the forward transformation between the RGMA and the antenna beam coordinate axes. Finally, the control unit 66 receives information relative to the alignment of the antenna, heading, climb or dive, and roll of the ownship relative to the geographic coordinates from the unit 64 referred ti as $[\psi]^T[\theta]^T[\phi]^T[\sigma]^T$.

Since the sequence of angles between the antenna beam-axis and the geographic reference axes is known, the time history of angular position can be substituted for the angular rate of the antenna, and the customary set of antenna rate gyros can be eliminated. Antenna servo following error angles can also be measured directly, thus allowing the decoupling of the estimator from such servo following errors.

Figure 5:
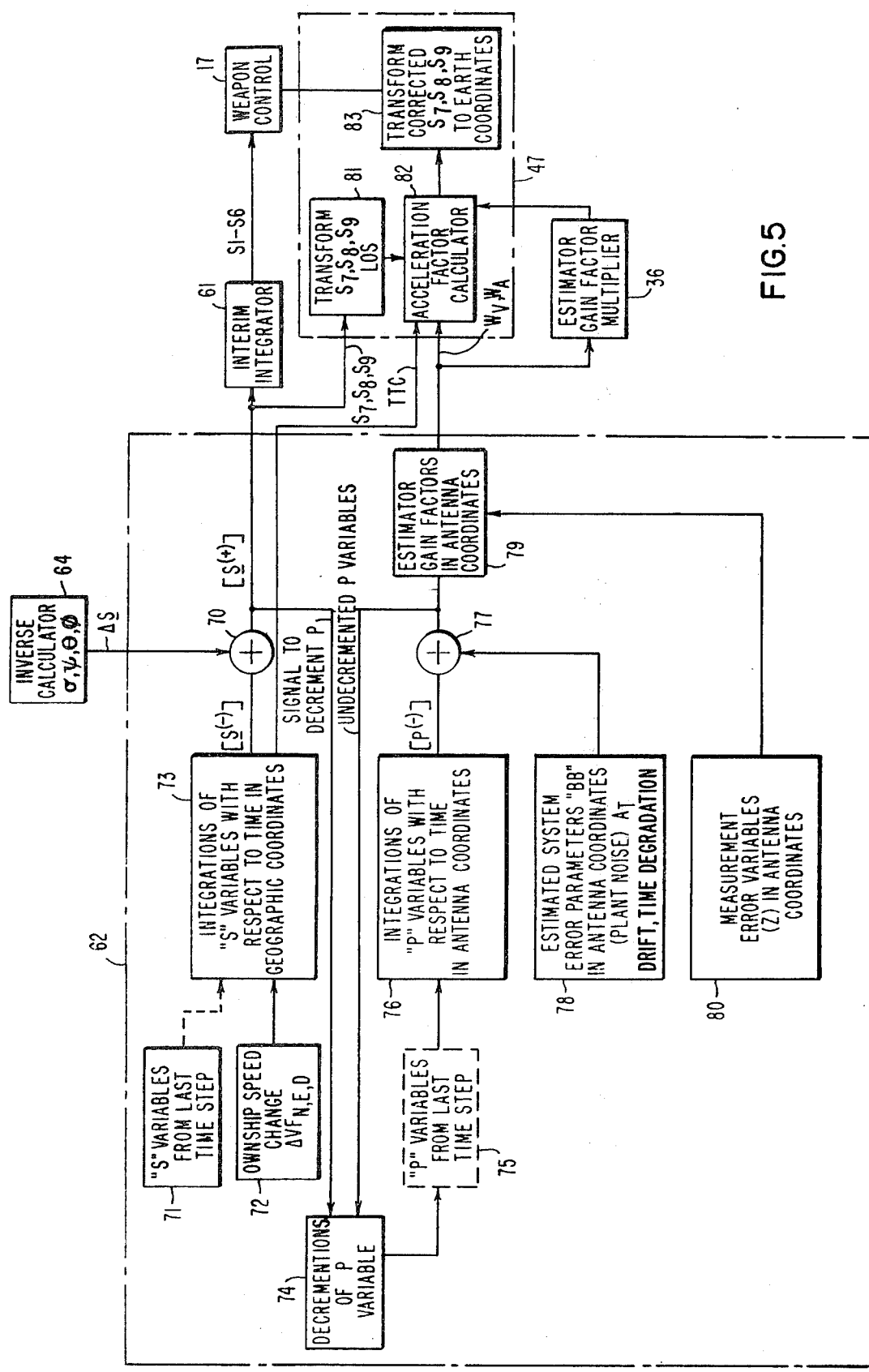
FIG. 5 is a functional block diagram to illustrate in more detail the state, variable and estimator gain calculator of FIG. 4.

Referring to FIG. 5, and the accompanying description which includes in more detail, the state-variable and Kalman-gain-factor calculator 62 of the estimator 30 of FIG. 4 receives every 0.02 second the three components of estimated errors of target range, range rate and acceleration with respect to the geographic coordinate system from the inverse calculator 64. These errors, of course, are those that were calculated as a result of a comparison of the last measured quantities $R_M$, $\dot{R}_M$ and estimated quantities $R_{EST}$ and $\dot{R}_{EST}$ of range and range rate, respectively, which were calculated to obtain the along-range error, $\Delta R$, and those calculated to obtain the estimated cross-range error ($R_{EST\times(\epsilon A)}$) in azimuth and ($R_{EST\times(-\epsilon E)}$) in elevation and the estimated error of range of range rate change $\Delta \dot{R}$ and then multiplied by the estimator gains $W_P$, $W_V$, and $W_A$ calculated during the previous time step by the multiplier 36 as described in connection with FIG. 4. These errors referred to as $\Delta R_{N,E,D}$, $\Delta \dot{R}_{N,E,D}$, and $\Delta AT_{N,E,D}$, and collectively referred to as $\Delta S$ variables are summed at 70 with the S or state variables to obtain the updated estimated position or state of the target in geographic coordinates. Thus, the estimator estimates nine state variables. These S variables from the last time step as shown within dotted lines 71 are modified by the ownship change of velocity $\Delta VF_{N,E,D}$ along the geographic axis as shown in 72 for the integration of such variables with respect to time as shown in block 73. Such calculation is performed in accordance with the following equation.

$$S_{K+1}^{(-)} = [\phi(t_{K+1}, t_K)]S_k^{(+)} - \begin{bmatrix} \frac{q}{2}(t_{K+1} - t_K) \\ q \\ 0\ (3 \times 1) \end{bmatrix} \quad (1)$$

The term q represents incremental ownship INS velocity change since time $t_K$. The subscripts K and K+1 denote consecutive time steps in the digital computation. The superscript (−) indicates that no correction for an observation has been made. A (+) superscript signifies that a correction has been made after a measurement or observation. The matrix $[\phi(t_{K+1}, t_K)]$ serves as an integration with respect to time.

These integrated state variables are input to the interim integrator 61 as previously mentioned in connection with FIG. 4.

The estimator portion 62 also includes corrections to compensate for errors in the estimated states S, which are caused by system errors, as are sometimes referred to as estimation uncertainty and described as P variables. These P variables are initialized at a certain value at predetermined times and decremented during each time step. Such variables in a typical system of the type described, are those that relate to range track $[P_R]$, angle track in azimuth $[P_{AZ}]$, and angle track in elevation $[P_{EL}]$. In actual practice $[P_{AZ}]$ and $[P_{EL}]$ are equal, and only one of the pair is used.

The event, correction of the estimated system states at the output of 70, is utilized to initiate an operation to decrement the P variables at 74, which decrementation is subtracted from the P variables during the last time step at 75. These P variables, during the last time step are integrated with respect to time at 76 to calculate such variables in the antenna or line-of-sight coordinates in contrast to the geographic coordinates of the S matrix. The individual elements $P_R$, $P_{AZ}$, and $P_{EL}$ are arranged in accordance with the following equations.

$$[P_R] = \begin{bmatrix} P_{1R} & P_{AR} & P_{BR} \\ P_{AR} & P_{2R} & P_{CR} \\ P_{BR} & P_{CR} & P_{3R} \end{bmatrix} \quad (2)$$

The elements $P_{1R}$, $P_{AR}$ and $P_{BR}$ influence the Kalman gain directly when position, velocity and acceleration states, respectively, are incremented after a range observation.

$$[P_{AZ}] = \begin{bmatrix} P_{1A} & P_{AA} & P_{BA} \\ P_{AA} & P_{2A} & P_{CA} \\ P_{BA} & P_{CA} & P_{3A} \end{bmatrix} \quad (3)$$

The elements $P_{1A}$, $P_{AA}$, and $P_{BA}$ directly control Kalman gain when incrementing position, velocity, and acceleration states, respectively, after an azimuth angle track observation.

$$[P_{EL}] = \begin{bmatrix} P_{1E} & P_{AE} & P_{BE} \\ P_{AE} & P_{2E} & P_{CE} \\ P_{BE} & P_{CE} & P_{3E} \end{bmatrix} \quad (4)$$

The use of the elements of $[P_{EL}]$ is analogous to that of $[P_{AZ}]$. Unless the error covariances are significantly different between the azimuth and elevation channels only one matrix need be formed for the two channels. Only six unique terms need be computed for any matrix $[P_R]$, $[P_{AZ}]$ or $[P_{EL}]$.

In the time integration of the estimation error covariance in block 76, the transition matrix is evaluated in accordance with the following equation.

$$\begin{aligned}
[P_{RK+1}^{(-)}] &= [\phi_S(t_{K+1}, t_K)][P_{RK}^{(+)}][\phi_S(t_{K+1}, t_K)]^T + [B_R] \\
[P_{AZK+1}^{(-)}] &= [\phi_S(t_{K+1}, t_K)][P_{AZK}^{(+)}][\phi_S(t_{K+1}, t_K)]^T + [B_{AZ}] \quad (5) \\
[P_{ELK+1}^{(-)}] &= [\phi_S(t_{K+1}, t_K)][P_{ELK}^{(+)}][\phi_S(t_{K+1}, t_K)]^T + [B_{EL}]
\end{aligned}$$

The matrices [B] represent the closed form of the integral of system error spectral densities (plant noise) since the last pass. Individual elements of $[B_R]$ have the values associated with the range pass of the previous mechanization. The matrix representing $[B_{AZ}]$ or $[B_{EL}]$ has the values previously mechanized for the angle pass.

The estimation errors or P variable calculated in block 76 are summed at 77 with the estimated system error parameters (BB) in antenna coordinates as shown in block 78. Such system parameters are predetermined estimates, the effect of the system of plant noise, and such variables are also in antenna coordinates.

At the input of estimator gain factor calculator 79 are the measurement error variables in antenna coordinates referred to as Z variables which are combined with the P variables to obtain the estimator gains $W_P$, $W_V$, and $W_A$, for position, velocity, and acceleration, respectively, also expressed in antenna coordinates, for weighing the estimated range and range rate calculations in the multiplier 36 (FIG. 4).

Thus, the estimate range, range rate, and target acceleration relative to the geographic coordinate system utilizing estimator gains calculated in the antenna coordinate system are obtained for the nine state variables S in accordance with the following equations:

$$\begin{bmatrix} S_1^{(+)} \\ S_2^{(+)} \\ S_3^{(+)} \end{bmatrix}_m = \begin{bmatrix} S_1^{(-)} \\ S_2^{(-)} \\ S_3^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\dfrac{P_{1R}^{(-)}}{P_{1R}^{(-)}+Z_R}\right)(R_{obs}-R_{pred}) \\ \left(\dfrac{P_{1A}^{(-)}}{P_{1A}^{(-)}+Z_{AZ}}\right)(R_{pred}\,\epsilon_A) \\ \left(\dfrac{P_{1E}^{(-)}}{P_{1E}^{(-)}+Z_{EL}}\right)(-R_{pred}\,\epsilon_E) \end{bmatrix}_m \quad (6)$$

The terms $P_{IR}^{(-)}/(P_{1R}^{(-)}+Z_R)$, $P_{1A}^{(-)}/(P_{1A}^{(-)}+Z_{AZ})$, and $P_{1E}^{(-)}/(P_{1E}^{(-)}+Z_{EL})$ are also designated as $W_{PR}$, $W_{PA}$ and $W_{PE}$, respectively in final value computations.

$$\begin{bmatrix} S_4^{(+)} \\ S_5^{(+)} \\ S_6^{(+)} \end{bmatrix}_m = \begin{bmatrix} S_4^{(-)} \\ S_5^{(-)} \\ S_6^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\dfrac{P_{AR}^{(-)}}{P_{1R}^{(-)}+Z_R}\right)(R_{obs}-R_{pred}) \\ \left(\dfrac{P_{AA}^{(-)}}{P_{1A}^{(-)}+Z_{AZ}}\right)(R_{pred}\,\epsilon_A) \\ \left(\dfrac{P_{AE}^{(-)}}{P_{1E}^{(-)}+Z_{EL}}\right)(-R_{pred}\,\epsilon_E) \end{bmatrix}_m \quad (7)$$

The terms $P_{AR}^{(-)}/(P_{AR}^{(-)}+Z_R)$, $P_{AA}^{(-)}/(P_{1A}^{(-)}+Z_{AZ})$, and $P_{AE}^{(-)}/(P_{1E}^{(-)}+Z_{EL})$ are also designated as $W_{VR}$, $W_{VA}$ and $W_{VE}$, respectively in the final value computations.

$$\begin{bmatrix} S_7^{(+)} \\ S_8^{(+)} \\ S_9^{(+)} \end{bmatrix}_m = \begin{bmatrix} S_7^{(-)} \\ S_8^{(-)} \\ S_9^{(-)} \end{bmatrix}_m + \begin{bmatrix} C_1^{(1)} & C_2^{(1)} & C_3^{(1)} \\ C_1^{(2)} & C_2^{(2)} & C_3^{(2)} \\ C_1^{(3)} & C_2^{(3)} & C_3^{(3)} \end{bmatrix}_m \begin{bmatrix} \left(\dfrac{P_{BR}^{(-)}}{P_{1R}^{(-)}+Z_R}\right)(R_{obs}-R_{pred}) \\ \left(\dfrac{P_{BA}^{(-)}}{P_{1A}^{(-)}+Z_{AZ}}\right)(R_{pred}\,\epsilon_A) \\ \left(\dfrac{P_{BE}^{(-)}}{P_{1E}^{(-)}+Z_{EL}}\right)(-R_{pred}\,\epsilon_E) \end{bmatrix}_m \quad (8)$$

The terms $P_{BR}^{(-)}/(P_{1R}^{(-)}+Z_R)$, $P_{BA}^{(-)}/(P_{1A}^{(-)}+Z_{AZ})$, and $P_{BE}^{(-)}/(P_{1E}^{(-)}+Z_{EL})$ are also designated as $W_{AR}$, $W_{AA}$ and $W_{AE}$, respectively in final value computations.

In equations (6), (7) and (8), $R_{obs}$ is observed range, $R_{pred}$ is predicted range and $_A$ and $_E$ are observed net angle track errors in azimuth and elevation, respectively, measured in radians. $Z_R$, $Z_{AZ}$ and $Z_{EL}$ are measurement error covariances in range, azimuth and elevation, respectively. As mechanized, further simplifications apply.

$$P_{1A}=P_{1E} \quad (9)$$

$$P_{AA}=P_{AE} \quad (10)$$

$$P_{BA}=P_{BE} \quad (11)$$

$$Z_{AZ}=Z_{EL} \quad (12)$$

After each observation or measurement, the amount of uncertainty of the estimation is reduced and the P variables are obtained in block 76 in accordance with the following equation.

$$[P_m^{(+)}] = \{[I]-[W_m][h_m]\}[P_m^{(-)}] \quad (13)$$

More specifically, $P_R$, $P_{AZ}$, and $P_{EL}$ are calculated in accordance with the following reduced form equations.

$$[P_R{}^{(+)}] = \begin{bmatrix} P_{1R}{}^{(-)}\left(1 - \dfrac{P_{1R}{}^{(-)}}{P_{1R}{}^{(-)} + Z_R}\right) & P_{AR}{}^{(-)}\left(1 - \dfrac{P_{1R}{}^{(-)}}{P_{1R}{}^{(-)} + Z_R}\right) & P_{BR}{}^{(-)}\left(1 - \dfrac{P_{1R}{}^{(-)}}{P_{1R}{}^{(-)} + Z_R}\right) \\ P_{AR}{}^{(-)}\left(1 - \dfrac{P_{1R}{}^{(-)}}{P_{1R}{}^{(-)} + Z_R}\right) & P_{2R}{}^{(-)} - \dfrac{(P_{AR}{}^{(-)})^2}{P_{1R}{}^{(-)} + Z_R} P_{CR}{}^{(-)} - \dfrac{P_{AR}{}^{(-)} P_{BR}{}^{(-)}}{P_{1R}{}^{(-)} + Z_R} \\ P_{BR}{}^{(-)}\left(1 - \dfrac{P_{1R}{}^{(-)}}{P_{1R}{}^{(-)} + Z_R}\right) P_{CR}{}^{(-)} - \dfrac{P_{AR}{}^{(-)} P_{BR}{}^{(-)}}{P_{1R}{}^{(-)} + Z_R} P_{BR}{}^{(-)} - \dfrac{(P_{BR}{}^{(-)})^2}{P_{1R}{}^{(-)} + Z_R} \end{bmatrix} \quad (14)$$

$$[P_{AZ}{}^{(+)}] = \begin{bmatrix} P_{1A}{}^{(-)}\left(1 - \dfrac{P_{1A}{}^{(-)}}{P_{1A}{}^{(-)} + Z_{AZ}}\right) & P_{AA}{}^{(-)}\left(1 - \dfrac{P_{1A}{}^{(-)}}{P_{1A}{}^{(-)} + Z_{AZ}}\right) & P_{BA}{}^{(-)}\left(1 - \dfrac{P_{1A}{}^{(-)}}{P_{1A}{}^{(-)} + Z_{AZ}}\right) \\ P_{AA}{}^{(-)}\left(1 - \dfrac{P_{1A}{}^{(-)}}{P_{1A}{}^{(-)} + Z_{AZ}}\right) & P_{2A}{}^{(-)} - \dfrac{(P_{AA}{}^{(-)})^2}{P_{1A}{}^{(-)} + Z_{AZ}} P_{CA}{}^{(-)} - \dfrac{P_{AA}{}^{(-)} P_{BA}{}^{(-)}}{P_{1A}{}^{(-)} + Z_{AZ}} \\ P_{BA}{}^{(-)}\left(1 - \dfrac{P_{1A}{}^{(-)}}{P_{1A}{}^{(-)} + Z_{AZ}}\right) P_{CA}{}^{(-)} - \dfrac{P_{AA}{}^{(-)} P_{BA}{}^{(-)}}{P_{1A}{}^{(-)} + Z_{AZ}} P_{BA}{}^{(-)} - \dfrac{(P_{BA}{}^{(-)})^2}{P_{1A}{}^{(-)} + Z_{AZ}} \end{bmatrix} \quad (15)$$

$$[P_{EL}{}^{(+)}] = \begin{bmatrix} P_{1E}{}^{(-)}\left(1 - \dfrac{P_{1E}{}^{(-)}}{P_{1E}{}^{(-)} + Z_{EL}}\right) & P_{AE}{}^{(-)}\left(1 - \dfrac{P_{1E}{}^{(-)}}{P_{1E}{}^{(-)} + Z_{EL}}\right) & P_{BE}{}^{(-)}\left(1 - \dfrac{P_{1E}{}^{(-)}}{P_{1E}{}^{(-)} + Z_{EL}}\right) \\ P_{AE}{}^{(-)}\left(1 - \dfrac{P_{1E}{}^{(-)}}{P_{1E}{}^{(-)} + Z_{EL}}\right) & P_{2E}{}^{(-)} - \dfrac{(P_{AE}{}^{(-)})^2}{P_{1E}{}^{(-)} + Z_{EL}} P_{CE}{}^{(-)} - \dfrac{P_{AE}{}^{(-)} P_{BE}{}^{(-)}}{P_{1E}{}^{(-)} + Z_{EL}} \\ P_{BE}{}^{(-)}\left(1 - \dfrac{P_{1E}{}^{(-)}}{P_{1E}{}^{(-)} + Z_{EL}}\right) P_{CE}{}^{(-)} - \dfrac{P_{AE}{}^{(-)} P_{BE}{}^{(-)}}{P_{1E}{}^{(-)} + A_{EL}} P_{BE}{}^{(-)} - \dfrac{(P_{BE}{}^{(-)})^2}{P_{1E}{}^{(-)} + Z_{El}} \end{bmatrix} \quad (16)$$

The acceleration compensator within the dashed lines referred to at 47, which was discussed in connection with FIG. 4 and which forms no part of the present invention, receives the estimated values for estimated target acceleration $AT_N$, $AT_E$, and $AT_D$ relative to the geographic or earth coordinates. These estimated acceleration values are referred to as S7, S8, and S9 in the previous equations. Also, the target time constant, TTC, and the estimator gain factors $W_V$, and $W_A$ which were calculated in block 79 are input to the compensator 47. The compensator calculates a corrected estimation factor for input to the weapon control unit for properly aiming the weapon at severely maneuvering targets that are accelerating in excess of 1G, for example. As previously mentioned, the acceleration estimation requires that old or obsolete estimates; that is, those estimates that were calculated during a previous step are allowed to decay. The penalty is that the magnitude of the acceleration estimate never achieves its full value. This attenuation inherent in the estimating process is sufficient to preclude successful control of a weapon, camera, or other aiming device with respect to severely maneuvering targets. Thus, the compensator 47 is intended for use in correcting the acceleration outputs from the state variable and Kalman gain factor calculator 62 of the estimator 30. The compensator 47 transforms the acceleration estimates S7, S8, and S9 from geographic coordinates to line-of-sight coordinates, as noted at block 81. These transformed values are then combined in a manner hereinafter described with the Kalman gain factors $W_V$ and $W_A$ by an acceleration factor calculated 82. The corrected acceleration outputs from the block 82 are then transformed to geographic or earth coordinates at block 83 where they are utilized along with the estimated range and range rate calculations by the weapon control unit 17. The block 82 also receives an input TTC which corresponds to the target time constant by which the acceleration calculation is decremented during each calculation of the computer.

Figure 6:
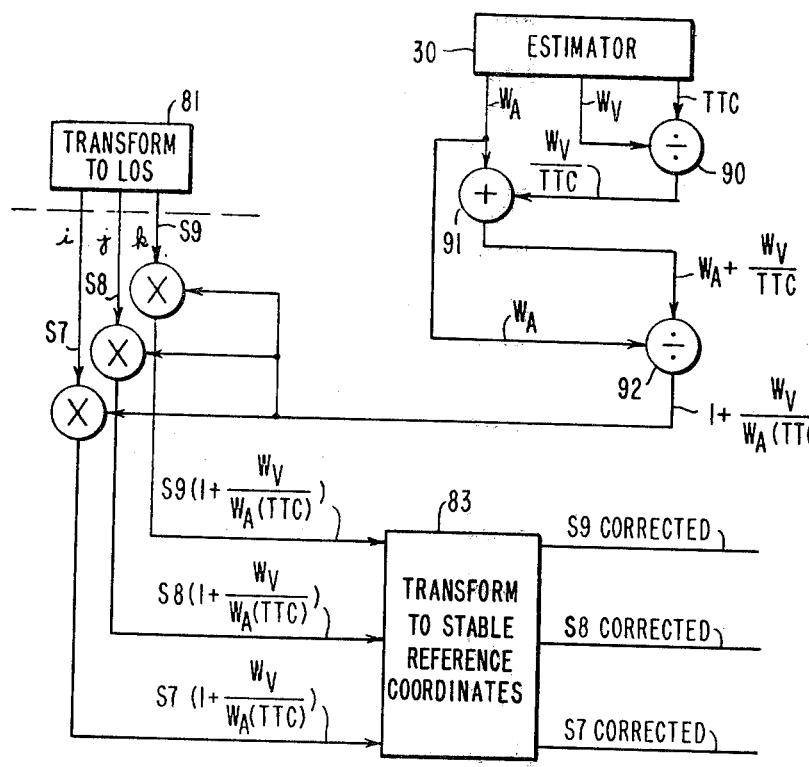
FIG. 6 is a schematic diagram illustrating the transformation of coordinates with respect to acceleration.

Referring to FIG. 6, the estimator or Kalman gain $W_V$ is divided by the target time constant TTC at device 90. The output of the device 90 is then added at 91 to the estimator gain $W_A$ to obtain a result $W_A$ plus $W_V/TTC$. This result is then divided by the estimator factor $W_A$ at 92 to obtain the result $1 + W_V/W_{A(TTC)}$. The estimated acceleration terms relative to the dead-ahead, righthand and down coordinates of the line-of-sight system referred to as S7, S8 and S9, respectively, are then each multiplied by the quantity $1 + W_V/W_{A(TTC)}$ to obtain the corrected acceleration estimates that are then transformed relative to earth coordinates for controlling the weapon control system.

Figure 7:
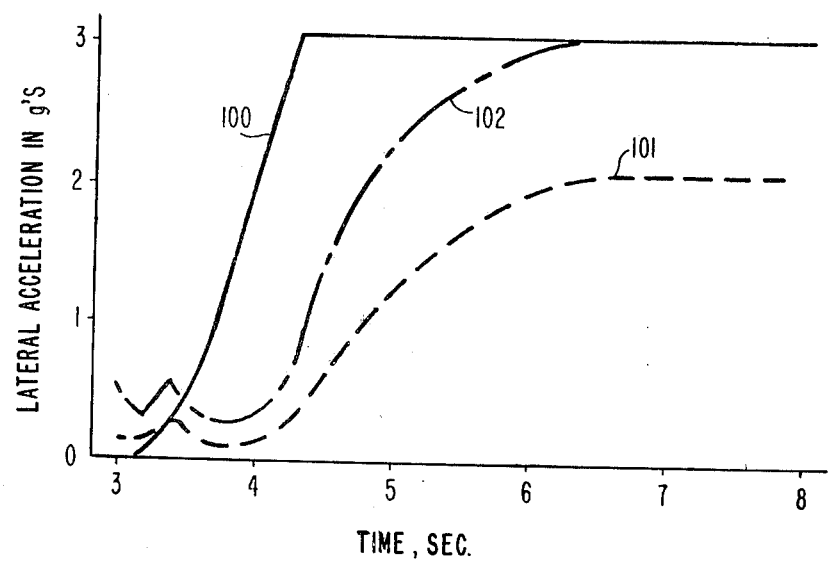
FIGS. 7, 8 and 9 are graphical illustrations of the operation of a system with and without the benefit of the acceleration compensation.
Figure 8:
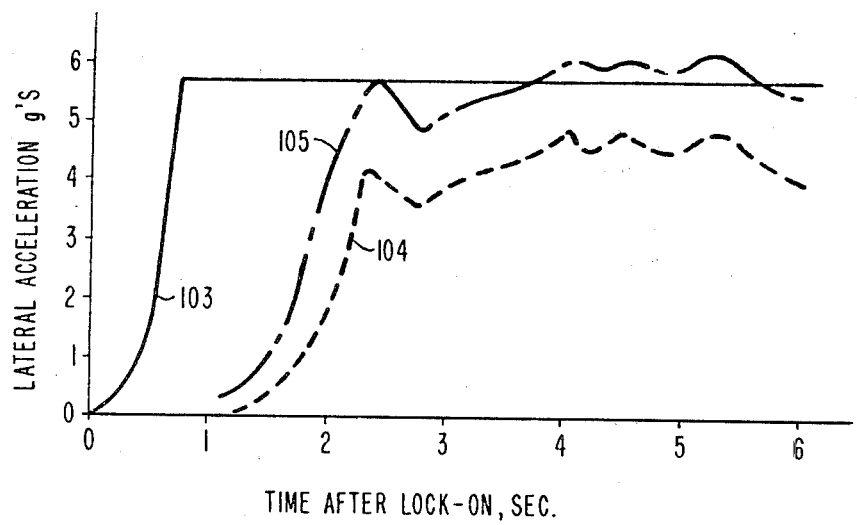
Figure 9:
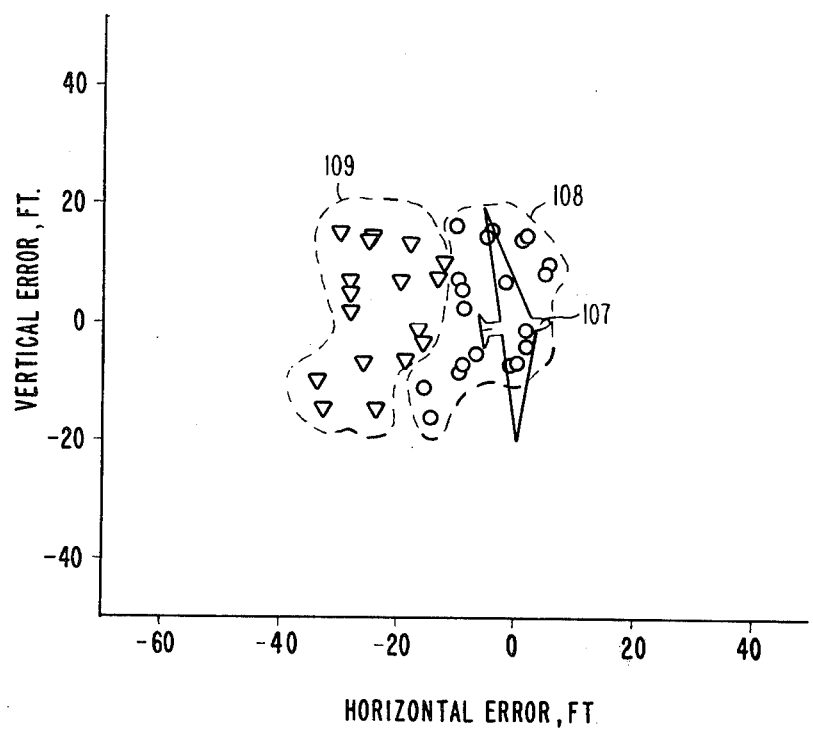

Referring to FIG. 7, a graphical illustration of a radar system utilizing a nine state estimator in a three dimensional simulation of an aircraft tracking a maneuvering target, was simulated both with and without the acceleration compensator herein described. In the graph, it is assumed that the tracking aircraft and the target aircraft are approaching headon in an initial segment of antiparallel non-maneuvering flight. Three seconds after lock-on of the tracker, both aircraft turn away from each other in 3-G horizontal turns. Radar noise is omitted for ease of comparing accuracy. Line 100 represents the true acceleration of the target aircraft relative to the tracking aircraft. Dashed line 101 represents the estimated acceleration without the benefit of the acceleration compensator; and line 102 represents the estimated acceleration utilizing the acceleration compensator. It is seen from FIG. 7 that without the compensator, the estimated acceleration reaches only about two-thirds of the true value. With the compensator, it is seen from the graph of FIG. 7 that the estimated acceleration coincides with the actual acceleration less than three seconds after breakaway. Referring to FIG. 8, the graph illustrates the results of a tracker located behind the target at an average aspect angle of 163° off the target nose. The target is turning with 5.67 G's of lateral acceleration toward the line-of-sight of the aircraft antenna. Radar noise is applied to the track inputs. In FIG. 8, curve 103 represents the true target acceleration, curve 104 represents the estimated acceleration without the compensator; while curve 105 represents the estimated acceleration with the compensator. Thus it can be seen from FIGS. 7 and 8 that the estimation of acceleration is much improved by the compensator under noisy conditions when the estimated acceleration is appreciable. To prevent magnification of pure noise, it is found that the compensation of acceleration should be suppressed when the acceleration estimate is under some threshold in the neighborhood of one-half G's, for example. Referring to FIG. 9, the use of a compensator to improve the prediction of future target position is illustrated in which the conditions are the same as for FIG. 8. Here, a target silhouette 107 is shown with a predicted center of the target selected normal to the line-of-sight. An envelope of predicted locations within the dashed lines referred to at 108 encloses the target silhouette 107 when the compensator is used. However, the envelope of predicted positions referred to within the dashed lines 109 does not intersect the target 107 when the compensator is not utilized. In the above examples, a two-second and a variable time constant TTC were used to decrement old estimates in FIGS. 7 and 8, respectively. Thus, improved results for rapidly maneuvering targets where the attenuation of estimated acceleration can be corrected by multiplying the attenuated reading by the reciprocal of the final value of the unit step response provides an improved estimate for control systems.

Referring to FIGS. 10A–10D, a flow chart of the Kalman type estimator is shown. The estimator receives a variety of hardware and software system inputs as previously mentioned and produces relative output target range or position, range rate or velocity, and acceleration estimates. The estimator initially sets up an array for range, range rate, and acceleration, then looks at measurements that the radar system is making. Also, error information is obtained from the inputs to the estimator regarding how far the previous estimate was in error. The estimator then receives an error and accepts a portion of that error. The accepted portion of that error, which is referred to as the Kalman gain, is then factored into the next estimate for range, azimuth, and elevation of the target. The fraction of the error used is of course determined by the gain of the estimator. The main output of the estimator, as previously mentioned, is a nine element array, referred to as S(1) through S(9), which contain the X, Y, and Z platform coordinates for position, velocity, and total target acceleration.

Figure 10A:
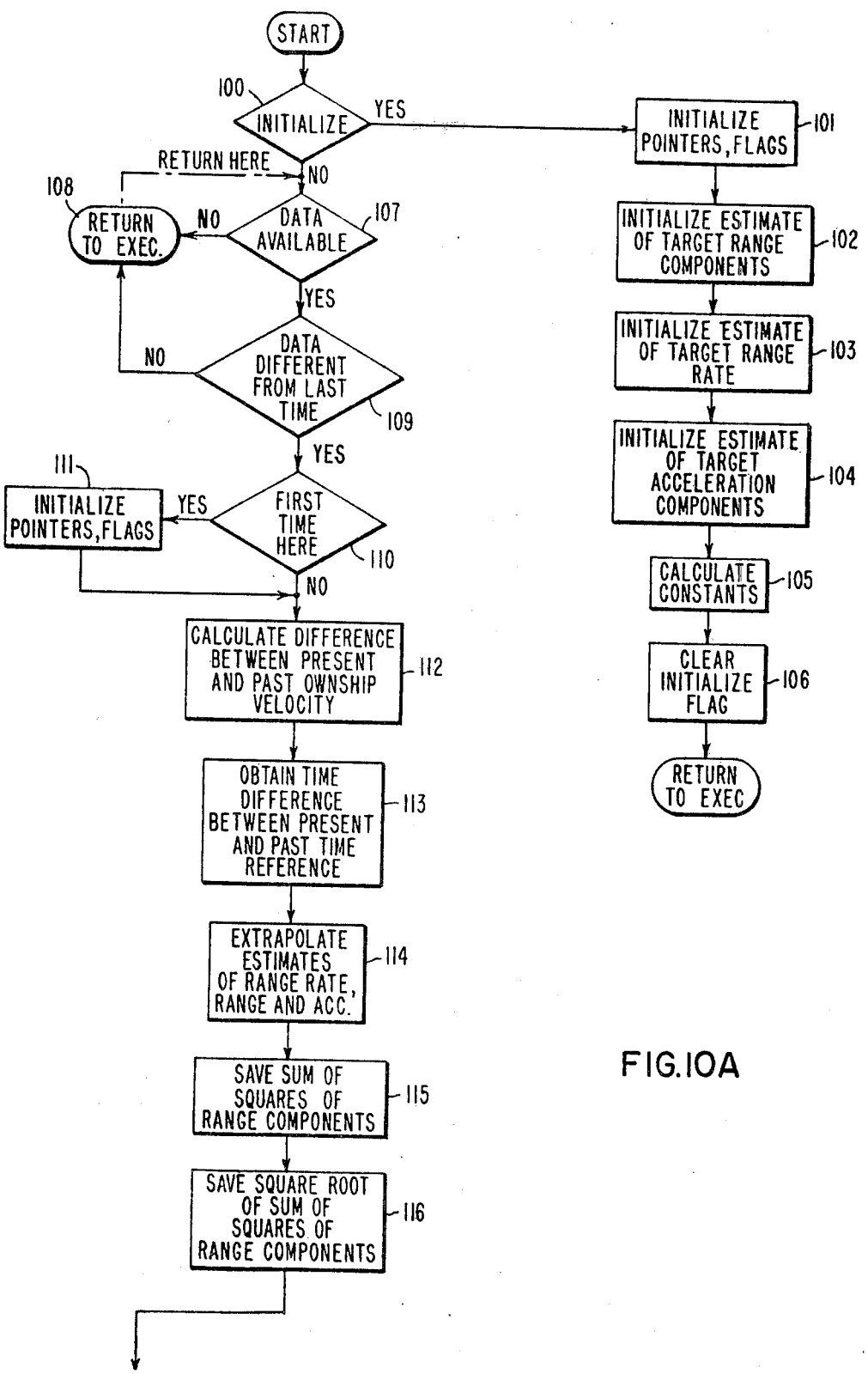
FIGS. 10A–10D illustrates a flow chart of the estimator routine.
Figure 10B:
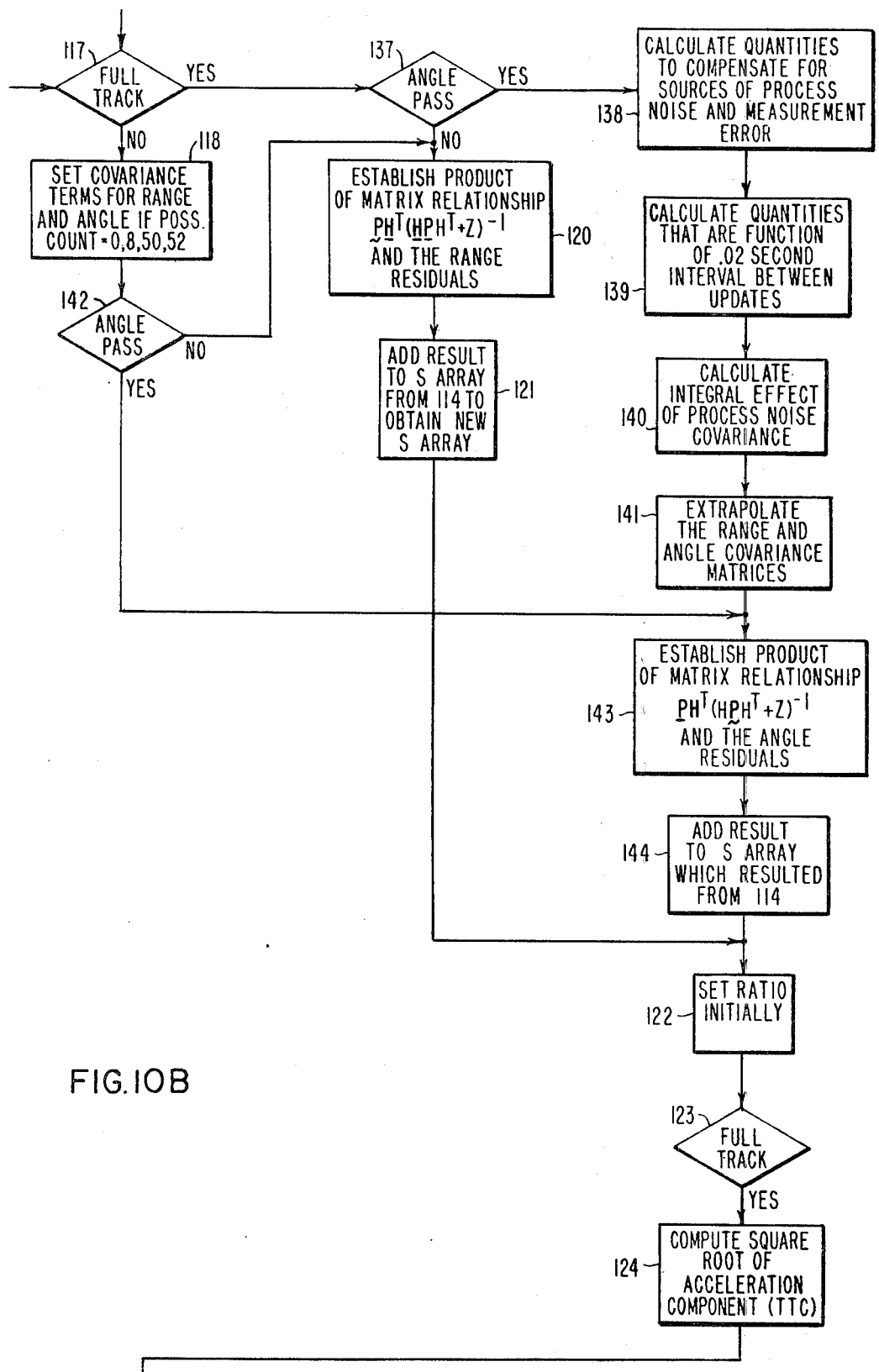
Figure 10C:
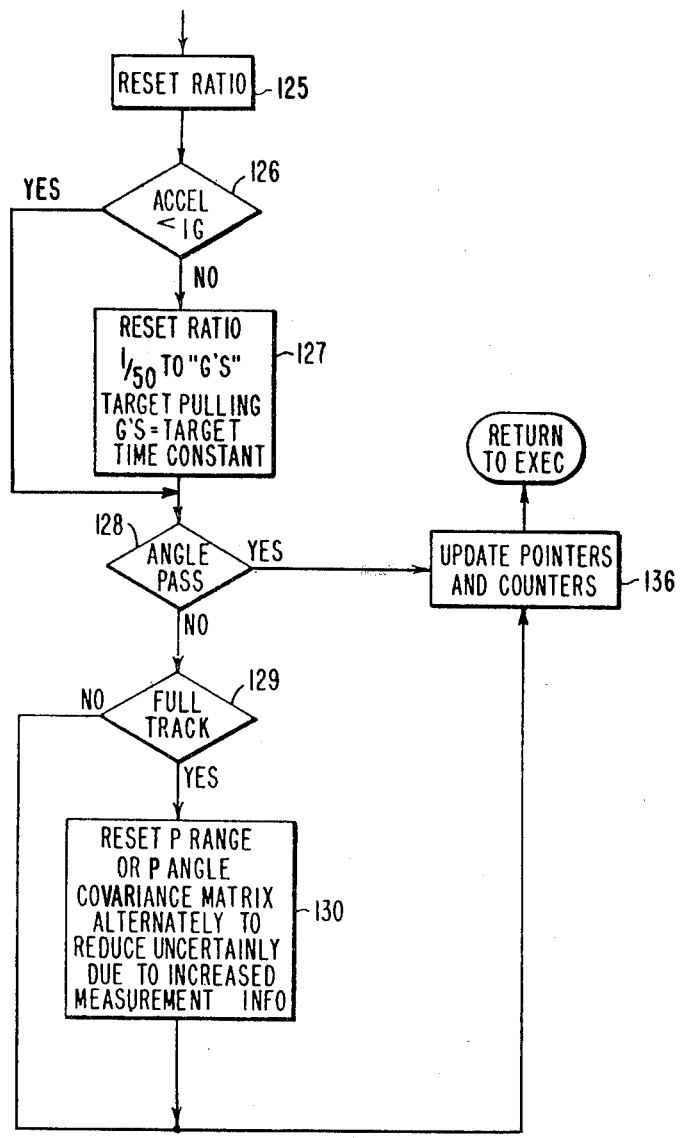

Referring to FIG. 10A, the program is initialized at block 100 whenever the track mode of the radar system is initiated. When the system indicates that initialization is to be performed, the flags and pointers, and constants for glint effect, process noise, and covariance are initialized at block 101. As shown in block 102, the estimate of target range components is initialized and the space to platform coordinates for S(1), S(2), and S(3) are transformed from space to platform in accordance with the following equation.

$$S(1) = R_{XP}$$

$$S(2) = R_{YP}$$

$$S(3) = R_{ZP}$$

where $R_{XP}$, $R_{YP}$, and $R_{ZP}$ are the geographic coordinate components of target range, and in particular $$\begin{bmatrix} R_{XP} \\ R_{YP} \\ R_{ZP} \end{bmatrix} = [\psi_P]^{-1} \cdot \begin{bmatrix} AARANGE * AAUVLOSX \\ AARANGE * AAUVLOSY \\ AARANGE * AAUVLOSZ \end{bmatrix}$$

$$[\psi_P]^{-1} = \begin{bmatrix} \cos\psi_P & -\sin\psi_P & 0 \\ \sin\psi_P & \cos\psi_P & 0 \\ 0 & 0 & 1 \end{bmatrix}$$

AARANGE = intitial centroided range to target $\begin{bmatrix} AAUVLOSX \\ AAUVLOSY \\ AAUVLOSZ \end{bmatrix}$ = line of sight unit vector (components) in space coordinates, or coordinate system of the scan pattern generator The above is mechanized in block 102 as follows:

$$S(1) = [(\cos \psi_P)(AAUVLOSX*AARANGE) + (\sin \psi_P)(AAUVLOSY\psi AARANGE)]$$

$$S(2) = [(\sin \psi_P)(AAUVLOSX*AARANGE) + (\cos \psi_P)(AAUVLOSY*AARANGE)]$$

$$S(3) = [AAUVLOSZ*AARANGE]$$

At block 103, the target range rate is initialized as follows:

$$S(4) = -VX_P$$
$$S(5) = -VY_P$$
$$S(6) = -VZ_P$$

where
S(4) = negative of ownship motion: platform X
S(5) = negative of ownship motion: platform Y
S(6) = negative of ownship motion: platform Z Next, the estimate of target acceleration components are initialized at block 104 by setting the acceleration components S(7), S(8), and S(9), to zero. The next step of initialization, occurs at block 105 where certain computational constants are calculated which are functions of the assumed average interval between estimation updates (1/50 of a second equals 0.02) for example. These constants are initialized by setting the time interval H to equal 0.02. Also, the remaining constants are set as follows.

ZE1 = square of range independent glint
AK1 = $H^2$
AK2 = AK ½
AK3 = H(AK2)
AK4 = $(AK2)^2$ where AK1, AK2, AK3, AK4 are constants. Then, the initialized flag is cleared as shown at block 106 and the control is returned to the executive program. Upon returning from the executive program after initialization, tests are performed to determine if new data has become available as shown by block 107. If no new data is available, control is returned to the executive program as shown at 108; but if new data is available as shown at block 109, the program checks to determine this is the first time at block 110 and then the pointers and flags are initialized at 111 as previously described in connection with block 101.

If the answer is in the negative from the block 110, the difference between the present and past ownship velocity is then calculated at block 112. Here, the filter estimates of range, range rate, and acceleration are extrapolated to the time reference to be used for the current update in accordance with the following equations:

$$R_{NEW} = R_{OLD} + \Delta t_K(V_{OLD} - \tfrac{1}{2} \Delta V_{INU}) + \frac{\Delta t^2_K}{2} \cdot A_{OLD}$$

$$V_{NEW} = V_{OLD} + \Delta t_K \cdot A_{OLD} - \Delta V_{INU}$$

$$A_{NEW} = A_{OLD} \cdot \left(1 - \frac{.02}{\tau_\alpha}\right)$$

where:
$\Delta t_K$ = the time between this and the last time reference
$\tau_\alpha = A\ OLD/32$ = target acceleration time constant
$V_{INU}$ = change in ownship motion since last update.

Block 112 is mechanized as follows: First obtain change in ownship motion:
Q0=VX$_P$−VXO
Q1=VY$_P$−VYO
Q2=VZ$_P$−VZO
where:

$\left. \begin{array}{l} VXO \\ VYO \\ VZO \end{array} \right\}$ = last set of platform coordinates of ownship motion $\left. \begin{array}{l} VX_p \\ VY_p \\ VZ_p \end{array} \right\}$ = current set of platform coordinates of ownship motion Then, the time difference $t_K$ between the present and the past time references obtained at block 113 in accordance with the following equation.

Obtain $t_K = H1 = (AATUP - AAKACLOK)$ where:
AATUP = time associated with current update AAKACLOK = time associated with previous update The estimates of range, range rate, and acceleration can now be extrapolated to the current reference time at block 114 in accordance with the following equations.

$$S(1)_{NEW} = S(1)_{OLD} + H1\left[S(4)_{OLD} - \frac{Q0}{2}\right] + (H1)^2/ 2*S(6)_{OLD}$$

$$S(2)_{NEW} = S(2)_{OLD} + H1\left[S(5)_{OLD} - \frac{Q1}{2}\right] + (H1)^2/ 2*S(7)_{OLD}$$

$$S(3)_{NEW} = S(3)_{OLD} + H1\left[S(6)_{OLD} - \frac{Q2}{2}\right] + (H1)^2/ 2*S(8)_{OLD}$$

$S(4)_{NEW} = S(4)_{OLD} + H1 * S(7)_{OLD} - Q0$
$S(5)_{NEW} = S(5)_{OLD} + H1 * S(8)_{OLD} - Q1$
$S(6)_{NEW} = S(6)_{OLD} + H1 * S(6)_{OLD} - Q2$
$S(7)_{NEW} = S(7)_{OLD} * (1 - HTITC)$
$S(8)_{NEW} = S(8)_{OLD} * (1 - HTITC)$
$S(9)_{NEW} = S(9)_{OLD} * (1 - HTITC)$
where:

$$HTITC = \frac{.02}{\text{Target Time Constant}}$$

Next, the sum of the squares of the range components are saved at block 115 in accordance with the following equation.

$$SCRG = S^2(1) + S^2(2) + S^2(3)$$

Then, at block 116, the square root of the sum of the squares of the range components are saved as follows:

$$YR = \sqrt{S^2(1) + S^2(2) + S^2(3)}$$

As noted by the decision block 117, the system then determines whether or not the target is within a predetermined range and the count of pass counter, which is a counter that passes a certain calculation. The pass counter determines when the range rate estimate is accurate enough to allow acceleration estimation. For example, as shown by block 118, a count of 8 allows range rate estimation to begin, whereas a count of 50 allows acceleration estimation to begin. Only range is being estimated between the counts of 0 and 8. The pass counter must reach a count of 53, for example, for full tracking operation to begin. If the target is beyond a predetermined limit, the count of 50 will not be exceeded by the pass counter. If normal tracking is not in progress, the constant P logic described in connection with block 118 is performed at the pass 0, 8, or 50.

Assuming that it is a full track, and there is not an angle pass in the present calculation, the product of the matrix relationship and the range residual is established as shown at block 120. For a range or angle update form the following matrix relationship, referred to as the weighting matrix, W:

$$W = P\ H^T (H\ P\ H^T + Z)^{-1}$$

where:
P = the covariance matrix (for range)
H = the sensitivity matrix, which defines how the range residual or angle residual shall be distributed over the current estimate of target range, range rate, and acceleration
Z = the observation mean-square error matrix Form the product of W and the range residual or angle residual and add the result to the extrapolated S array components resulting from the calculation of the block 114.

The above is mechanized for a range residual as follows:
Calculate:
PPSIGR = P(1,1,1) + ZR
B = PPSIGR*SCRG
BIGL(IX) = YR*AARERR*16.

| IX = | 1 |
| | 2 |
| | 3 |

For IX=9, I=3, II=3 initially, calculate:
U = P(1,II,1)*S(I)
UB = (U/2$^4$)/B
ULB = UB*BIGL(II)
S(IX)$_{NEW}$ = S(IX)$_{OLD}$ + ULB
where:

ZR = an adjustment for range measurement error
SCRG = $S^2(1) + S^2(2) + S^2(3)$ as defined in connection with the description of the equation for block 115.
AARERR = range residual
"IX" is decremented by 1 until 1, after which calculations cease.
"I" is decremented by 1 until zero, then reset to 3.
"II" is decremented by 1 whenever I is reset to 3.
ULB = product of range residual and the weighting matrix
$S(IX)_{OLD}$ = Those S values from equations described in connection with the block 114.

$$YR = \sqrt{S^2(1) + S^2(2) + S^2(3)}$$

The above equation for block 120 is executed 9 times according to the following values of IX, I, II:

| IX | I | II |
|----|---|----|
| 9  | 3 | 3  |
| 8  | 2 | 3  |
| 7  | 1 | 3  |
| 6  | 3 | 2  |
| 5  | 2 | 2  |
| 4  | 1 | 2  |
| 3  | 3 | 1  |
| 2  | 2 | 1  |
| 1  | 1 | 1  |

Then, the estimates of range rate, range, and acceleration in accordance with the equations described in connection with block 114 are added to the S array to obtain a new S array as shown at block 121. Then, the ratio of 0.02 to the target time constant is determined at block 122 in accordance with the following equation initially.

Let HTITC = 0.02/3.5
If the estimator is in full track as determined by decision block 123, the square root of the acceleration components are computed at block 124 in accordance with the following calculation.
TTC is an Arbitrary Computation
Let HTITC = 0.02 and if
TTC ≧ 32, re-calculate.
Then, the ratio is reset at block 125 which in effect accomplishes substitition of the new computation for the initial value. After the resetting of the ratio, the acceleration is checked to determine whether or not it is less than 1G at decision block 126; and if it is not, the ratio is reset as shown at block 127 in accordance with the final equation described in connection with block 104 where the estimate of target acceleration components was initiated.
If in this computation, there was not an angle pass as noted by decision block 128 and the system is in full track as noted at decision block 129, the block 130 performs an adjustment to the P matrix; that is the convariance matrix, to reduce the uncertainty in the estimator of range, range rate, and acceleration due to the addition of more measurement information. To obtain the new matrix adjustment, the values which are calculated from H, P, and W are substracted from the old P matrix. W is the weighting matrix, P is the covariance matrix for range, and H is the sensitivity matrix, which defines how the range error or residual or angle error or residual shall be distributed over the current estimate of target range, range rate, and acceleration. This adjustment is mechanized at the block 130 on alternate cycles or range passes as follows.

$P(2,2,MP) = P(2,2,MP) - P(1,2,MP)^2/PPSIGX$ $P(2,3,MP) = P(2,3,MP) - P(1,2,MP)*(P(1,3,MP)/PPSIGX$ $P(3,3,MP) = P(3,3,MP) - P(1,3,MP)^2/PPSIGX$ $P(1,3,MP) = P(1,3,MP) - P(1,1,MP)*P(1,3,MP)/PPSIGX$ $P(1,2,MP) = P(1,2,MP) - P(1,1,MP)*P(1,2,MP)/PPSIGX$ $P(1,1,MP) = P(1,1,MP) - P(1,1,MP)^2/PPSIGX$ where:
MP = 1 for range PPSIGX = PPSIGR MP = 2 for angle, PPSIGX = PPSIGE If the system is not in full track, the calculation 130 is omitted. Then, the pointers and counters are updated as described in connection with the block 101 at 136 and the program is returned to the executive.
If there is an angle pass as noted in decision block 137, then the quantities to compensate for the sources of process noise and measurement error are calculated at block 138 as follows.

ZE2 = mean of square angle noise error

N2 } = functions of spectral density
N3 } = computational factors

Then, the quantities are calculated that are functions of 0.02 second intervals between updates at block 139. These are computational constants which are functions of the assumed interval between estimator updates and are as follows.
H2D3 = $H^2/3$
H3D8 = $H^3/8$
H33 = $H^3/3$
H4D20 = $H^4/20$
where:
H = 0.02
Subsequently, the integral effect of the process noise covariance is calculated at block 140. This takes into account the integrated effect of the noise for range and angle updates. For range, the integrated effect is as follows.

BB(1) = N2*H33 + N3*H4D20
BB(2) = N2*AK2 + N3*H3D8
BB(3) = N3*H223
BB(5) = N2*H + N3*H2D3
BB(6) = N3*H
BB(9) = N3
For angle, the integrated effect is as follows.
BB(10) = a function of BB(1)
BB(11) = a function of BB(2)
BB(12) = BB(3)
BB(14) = a function of BB(5)
BB(15) = BB(6)
BB(16) = BB(9)
Then, at block 141 an extrapolation of the range and angle covariance error matrices is performed to take into account the increased uncertainty over the assumed average interval between estimator updates since the last update. This is represented in matrix form as follows:

$$P_{NEW} = \phi P_{OLD} \phi^t + BB \qquad 5$$

where:
 $\phi$ = static transition matrix $$\phi = \begin{bmatrix} I & (\Delta t)\,I & \frac{\Delta t}{2}\,I \\ O & I & (\Delta t)\,I \\ O & O & \frac{1-\Delta t}{Ta}\,I \end{bmatrix}$$

where: $\Delta t$ = assumed average interval between Kalman filter updates $$I = \begin{bmatrix} 1 & 0 & 0 \\ 0 & 1 & 0 \\ 0 & 0 & 1 \end{bmatrix} = \text{Identity Matrix}$$

$[\,]^T = >$ transpose
 BB = process noise covariance matrix $$O = \begin{bmatrix} 0 & 0 & 0 \\ 0 & 0 & 0 \\ 0 & 0 & 0 \end{bmatrix} = \text{Null Matrix}$$

In the estimator, this is mechanized as follows:
 For MP = 1 and then 2,

| | |
|---|---|
| P(1,1,MP) = | P (1,1,MP) + AK1 * P(2,2,MP) + AK4 * P(3,3,MP) + 2 * [H * P(1,2,MP) + AK2 * P(1,3,MP) + AK3 * P(2,3,MP)] + BB(1) or BB(10) |
| P(1,2,MP) = | P(1,2,MP) + H * P(1,3,MP) + 2. * AK1 * P(2,3,MP) + H * P(2,2,MP) + AK3 * P(3,3,MP) + BB(2) or BB(11) |
| P(1,3,MP) = | DELTA * [P(1,3,MP) + H * P(2,3,MP) + AK2 * P(3,3,MP)] + BB(3) or BB(12) |
| P(2,2,MP) = | P(2,2,MP) + AK1 * P(3,3,MP) + 2. * H * P(2,3,MP) + BB(5) or BB(14) |
| P(2,3,MP) = | DELTA * [P(2,3,MP) + H * P(3,3,MP)] + BB(6) or BB(15) |
| P(3,3,MP) = | DELTA$^2$ * P(3,3,MP) + BB(9) or BB(18) | where:
 DELTA = 1 − HTITC
  HTITC = (0.02/Target Time Constant)

BB = process noise covariances
 BB(1), BB(2), BB(3), BB(5), BB(6), BB(9) are used for MP = 1 for updating the P matrix for range.
 BB(10), BB(11), BB(12), BB(14), BB(15), BB(18) are used for MP = 2 for updating the P matrix for angle.

Then, for either a direct angle pass from decision block 142 or subsequent to the extrapolation of the range and angle covariance matrices of block 141, the product of the matrix relationship as shown in block 143 is established together with the angle errors or residuals in accordance with the following relationships which are the same as those utilized for the range errors in connection with the description of block 120. Thus, for angle errors the block 143 is mechanized as follows:
 HTITC = 0.02*32/KTTC For an angle update form the same matrix relationships as defined for the block 120, except use the angle residuals in place of the range residual.

For angle residuals or errors this is mechanized as follows.

Calculate:
ZZ = ZE1 + ZE2
PPSIGE = P(1,1,2) + ZZ
For IX = 7, I = 3, II = 3, initially, calculate:
RB(1) = AAEPSEX*YR/PPSIGE
RB(2) = AAEPSEX*YR/PPSIGE
V(1) = −P(1,II,2)*C3(I)
V(2) = P(1,II,2)*C2(I)
RET = RB(1)*V(1) + RB(2)*V(2)
S(IX)$_{NEW}$ = S(IX)$_{OLD}$ + RET where:
 ZE1, ZE2 are as defined a range dependent variable and and a constant velocity to mean square angle measurement error, respectively.
 AAEPSEX = elevation angle residual
 AAEPSAX = azimuth angle residual
 RET = product of angle residuals and the weighting matrix
 "IX" is decremented by 1 until 1, after which calculations cease
 "I" is decremented by 1 until zero, then reset to 2
 "II" is decremented by 1 whenever I is reset to 3. The previous equations are executed 9 times according to the the following values of IX, I, II:

| IX | I | II |
|----|---|----|
| 9 | 3 | 3 |
| 8 | 2 | 3 |
| 7 | 1 | 3 |
| 6 | 3 | 2 |
| 5 | 2 | 2 |
| 4 | 1 | 2 |
| 3 | 3 | 1 |
| 2 | 2 | 1 |
| 1 | 1 | 1 |

C2, C3 are defined as follows:

$$\begin{bmatrix} 0 & 0 & 0 \\ C2(1) & C2(2) & C2(3) \\ C3(1) & C3(2) & C3(3) \end{bmatrix} = [\lambda_E]\,[\lambda_A]\,[\phi]\,[\theta]\,[\psi_P]$$

where:

$$[\psi_P] = \begin{bmatrix} \cos\psi_P & \sin\psi_P & 0 \\ -\sin\psi_P & \cos\psi_P & 0 \\ 0 & 0 & 1 \end{bmatrix}$$

$$[\theta] = \begin{bmatrix} \cos\theta & 0 & -\sin\theta \\ 0 & 1 & 0 \\ \sin\theta & 0 & \cos\theta \end{bmatrix}$$

$$[\phi] = \begin{bmatrix} 1 & 0 & 0 \\ 0 & \cos\phi & \sin\phi \\ 0 & -\sin\phi & \cos\phi \end{bmatrix}$$

$$[\lambda_E] = \begin{bmatrix} \cos\lambda_E & 0 & -\sin\lambda_E \\ 0 & 1 & 0 \\ \sin\lambda_E & 0 & \cos\lambda_E \end{bmatrix}$$

-continued $$[\lambda_A] = \begin{bmatrix} -\sin \lambda_A & -\cos \lambda_A & 0 \\ -\cos \lambda_A & \sin \lambda_A & 0 \\ 0 & 0 & 1 \end{bmatrix}$$

$S(IX)_{OLD}$=Those S values from equations in block 114.

Then, this result is added to the S array which resulted from the calculation at block 114 at block 144. A Fortran listing showing one digital implementation of the estimator on a general purpose computer is included in Appendix A on pages A1 through A9 herein.

Figure 10D:
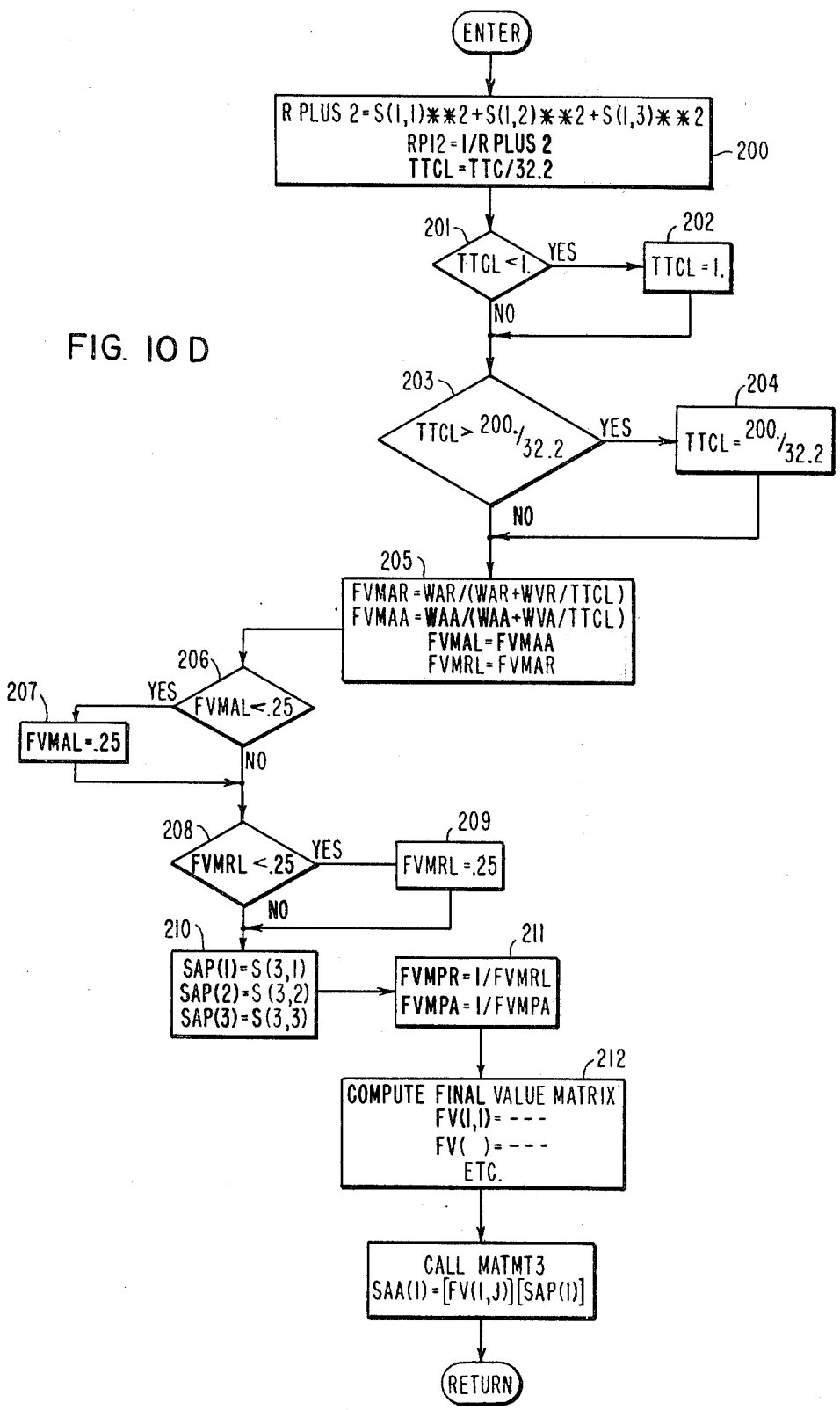

Referring to FIG. 10D, is a flow chart of an acceleration compensator FVCOMP which may be used in the system of the present invention for a three-dimensional system. This flow chart is appropriately labeled with Fortran statements corresponding to the listing herein for a clearer understanding. Also, such compensation system transforms the modified acceleration data between geographic and line-of-sight coordinates as well as correcting the estimation of acceleration for severely maneuvering targets.

Each time the program FVCOMP is run, the estimates of target position referred to as S(1,1), S(1,2) and S(1,3) are combined as shown in block 200 to obtain a signal corresponding to the square of the estimated range magnitude. This square of range magnitude referred to as RP12 is obtained by squaring the range magnitude of each geographic coordinate N, E, and D, referred to as S(1,1), S(1,2), and S(1,3) respectively, adding the results, and then obtaining the reciprocal of such sum, all as shown in block 200.

Then, the target time constant TTC from the estimator is rescaled to seconds to obtain a value TTCL which is equal to TTC/32.2. The limits of the value TTCL are then obtained by checking at block 201 to see if the time constant is less than 1. If it is, then such value is made equal to 1 at block 202. The time constant is then checked at block 203 to determine if such value is greater than two hundred divided by the value 32.2 or six seconds, for example, and if such is the case, the time constant TTCL is limited to six seconds at block 204. Such limiting insures that the time constant is sufficient for accuracy; and also, that the old data is not being used at the upper limit.

At block 205, an acceleration compensation factor or signal FVMRL for along-range compensation is generated by dividing the estimator or Kalman velocity gain factor for range observation $W_{VR}$ by the time constant TTCL and summing the result with the acceleration gain factor for range observation $W_{AR}$. The gain factor $W_{AR}$ is divided by the aforesaid summed result to obtain the compensation signal FVMRL. Such computation may be expressed in accordance with the following equation:

$$FVMRL = \frac{W_{AR}}{W_{AR} + \frac{W_{VR}}{TTCL}}$$

Also, at block 205 another compensation factor or signal FVMAL for angle compensation is generated by dividing the velocity gain factor for angle acceleration $W_{VA}$ by the time constant TTCL, adding the result to the acceleration gain factor for angle observation $W_{AA}$, and dividing the acceleration gain factor for angle observation $W_{AA}$ by the aforesaid result. This may be expressed in accordance with the following equation:

$$FVMAL = \frac{W_{AA}}{W_{AA} + \frac{W_{VA}}{TTCL}}$$

At block 206, the compensation signal FVMAL is checked so that compensation factor will not be an extreme value. If it is an extreme value, then such signal is limited at block 207. Similarly, the compensation signal FVMRL is checked at block 208 and made equal at block 209 if less than a predetermined value. Only one compensation factor FVMAL for angle is utilized because it is considered that the factor for azimuth and elevation are equal.

At block 210, the estimated acceleration states referred to as S(3,1), S(3,2), and S(3,3) formerly referred to as S7, S8 and S9, is provided with a new designator SAP(1), SAP(2), and SAP(3) respectively preparatory to the application of the signals FVMRL and FVMAL. At block 211, the reciprocal of the compensation signals FVMRL and FVMAL are computed and referred to as FVMPR and FVMPA respectively.

At block 212, a final value matrix or array is then computed utilizing the squared range magnitude R plus 2 and the reciprocal RP12, the compensation signal or factor reciprocals FVMPA and FVMPR, and the estimated target positions S(1,1), S(1,2) and S(1,3) preparatory to the compensated acceleration estimates SAA(I), SAA(II) and SAA(III). The nine element matrix or array is conventionally referred to as FV(1,1), FV(1,2), FV(1,3) ... FV(3,1), FV(3,2), FV(3,3) and computed for transformation to geographic coordinates to be as follows:

FV(1,1)=RP12×[(FVMPR)(S(1,1))²+FVMPA(R-PLUS2)−S(1,1)²]
FV(1,2)=RP12(S(1,1))(S(1,2))(FVMPR−FVMPA)
FV(1,3)=RP12(S(1,1))(S(1,3))(FVMRR−FVMPA)
FV(2,2)=RP12×[(FVMPR)(S(1,2))²+FVMPA(R-PLUS2)−S(1,2)²]
FV(2,3)=RP12(S(1,2))(S(1,3))(FVMPR−FVMPA)
FV(3,3)=RP12×[(FVMPR)(S(1,3))²+FVMPA(R-PLUS2)−S(1,3)²]
FV(2,1)=FV(1,2)
(FV(3,1)=FV(1,3)
FV(3,2)=FV(2,3)

From the above matrix, the estimated acceleration states are then calculated in geographic coordinates as follows:

For North, SAA(I)=FV(1,1)(S(3,1))+FV(1,2)(S(3,2))+FV(1,3)(-S(3,3))

For East, SAA(II)=FV(2,1)(S(3,1))+FV(2,2)(S(3,2))+FV(2,3)(-S(3,3)); and finally for the down coordinate,

SAA(III)=FV(3,1)(S(3,1))+FV(3,2)(S(3,2))+FV(3,3)-(S(3,3))

When the final value theorem is applied to the pertinent transfer functions it is found that the final response of estimated velocity to a unit step in velocity is unity and that the same is true for the unit step response of estimated position. No final value correction is needed except for the acceleration estimate.

In implementing the estimation system and programs described herein as well as other system functions reference is made to a commercially available millicomputer manufactured and sold by Westinghouse Electric Corporation more than one year prior to the filing of this application and described in a publication entitled CP-1138 Millicomputer copyrighted in 1972 by Westinghouse Electric Corporation.

Reference is made to U.S. Patent application Ser. No. 672,891 filed Apr. 1, 1976 by Robert I. Heller et al entitled "Digital Radar Control System and Method" for further explanation of certain details of the system and the millicomputer referred to herein, which application is incorporated herein by reference.

Reference is also made to U.S. Patent application Ser. No. 691,145 filed May 28, 1976, which is a continuation-in-part of Ser. No. 384,337 filed July 31, 1973 by K. S. Etow et al entitled "Method And System For The Independent Monitoring And Testing Of Computer Controlled Systems", for additional explanation of a computer controlled system, which application is incorporated herein by reference.

In summary, there has been shown and described a radar system wherein the measurements are processed relative to a line of sight coordinate system for applying the estimator gains and the predication or estimation of target position is processed relative to a stable coordinate system. Such information is then transformed to a radar gimbal mechanical axis coordinate system for operating the antenna to track the target.

The matrix operations have been greatly reduced by extrapolating the covariances in the antenna line of sight system and then performing a similarity transformation to compute the gains in a stable coordinate system.

```
C     INITIAL CONSTANTS
C
      CON=.017453293
      UNITY=1.
      H = 1./50.
      H33 = H**3/3.
      H2D3 = H**2/3.
      H223 = 2.*H2D3
      H3D8 = H**3/8.
      H4D20 = H**4/20.
      HTITC = H
      AK1 = H*H
      AK2 = AK1/2.
      AK3 = H*AK2
      AK4 = AK2*AK2
      ETFAC2 = 3.160.2/5.**3
      ETFAC3 = 2000.*6.2/3.H
      Z = H
      ZK2 = Z*Z/2.
      KALM = 53
      KAL1 = 8
      KAL2 = 50
      NODEVN = 0
      IP = 0
      IUP = 0

KKN= 4

C     INITIALIZE STATE VARIABLES S(1,1) THROUGH S(3,3)
 2000 CONTINUE
C     READ IN PHFB, ROLL ANGLE
C     READ IN THFB, BODY ELEVATION ANGLE
C     READ IN PSFB, HEADING ANGLE OF BODY
C     COMPUTE SIGMA, ELEVATION ANGLE OF RADAR GIMBAL AXES WITH RESPECT
C     TO BODY AXES
C     READ OWNSHIP SPEED COMPONENTS VFV(1), VFV(2), VFV(3)
C     READ OR COMPUTE SINE(SLAA) AND COSINE(CLAA) ANTENNA AZIMUTH
C     GIMBAL ANGLE
C     READ OR COMPUTE SINE(SLEA) AND COSINE(CLEA) ANTENNA ELEVATION
C     GIMBAL ANGLE
C     ESTABLISH TIME TO RE ENTER THIS BOX(2000)
      TP = TP+1./200.
 3000 CONTINUE
      IPS = IP
      IP = IP+1
      LP = LP+1
      HTEMP = FLOAT(LP)/200.
      CALL ORTHOG(2,-SIGMA,DT,4,PSTPHT)
      CALL ORTHOG(1,-PHFB,PSTPHT,14,DT)
      CALL ORTHOG(2,-THFB,DT,14,PSTPHT)
      CALL ORTHOG(3,-PSFB,PSTPHT,14,DT)
      BC2(1) = -SLAA
      BC2(2) = CLAA
      BC2(3) = 0.
      BC3(1) = CLAA*SLEA
      BC3(2) = SLAA*SLEA
      BC3(3) = CLEA
      DO 3123 I = 1,3
      C2(I) = DT(I,1)*BC2(1)+DT(I,2)*BC2(2)+DT(I,3)*BC2(3)
      C3(I) = DT(I,1)*BC3(1)+DT(I,2)*BC3(2)+DT(I,3)*BC3(3)
```

```
           Q(I) = VFV(I)-VFS(I)
           STEMP(I) = S(1,I)+S(2,I)*HTEMP-0.5*Q(I)*HTEMP+S(3,I)*(HTEMP**2/2.)
3123    CONTINUE
           YRTEM = SQRT(STEMP(1)**2+STEMP(2)**2+STEMP(3)**2)
           DO 3125 I = 1,3
           SLR(I) = (STEMP(1)*DT(1,I)+STEMP(2)*DT(2,I)+STEMP(3)*DT(3,I)
          1)/YRTEM
3125    CONTINUE
           IF(IUP.GT.0) GO TO 3124
           I = R/7500.
           IF(I.NE.0) GO TO 3121
           IR = 0
           GO TO 3122
3121    IR = 1+ALOG(FLOAT(I))/ALOG(2.)
3122    CONTINUE
           NT = IR-1
           NP1 = 13+2*IR
           NP2 = 15
           NP3 = 17-2*IR
3124    CONTINUE
           RFAC = 1.
           IF(IR.NE.0) RFAC = 2.**IR
           KKNTHR = KKN
           IF(MOD(IPS,KKNTHR).NE.0) GO TO 3595
           LP = 0
C       STATE EXTRAPOLATION
           DO 3200 I=1,3
           Q(I)=VFV(I)-VFS(I)
           VFS(I)=VFV(I)
3200    CONTINUE
           DO 3400 I=1,3
           S(1,I)=S(1,I)+Z*(S(2,I)-Q(I))+ZK2*S(3,I)
           S(2,I)=S(2,I)+Z*S(3,I)-Q(I)
           S(3,I)=DELTA*S(3,I)
3400    CONTINUE
           SCRG=S(1,1)**2+S(1,2)**2+S(1,3)**2
           YR=SQRT(SCRG)
C
C       TEST FOR DATA PRESENCE
           IF (MILL.EQ.0) GO TO 9000
           MP=MOD(NODEVN,2)+1
           IUP=IUPASS(MP)
           KODEVN=MOD(NODEVN,4)
C
C       TEST FOR KALMAN MODE - RESTRICTED(CONSTANT P) OR
C                              UNRESTRICTED(FULL KALMAN)
           IF (IUP.GE.KALM) GO TO 4700
C
4100    CONTINUE
           IF (IUP.NE.0.AND.IUP.NE.KAL2) GO TO 4400
C
C       RESTRICTED P MATRIX(CONSTANT 'P') MODE
C
C       P INITIAL
4200    CONTINUE
           ZE2=2.**11
           ZR=2.(NP1-2)-2.(NP1-5)
           DO 4300 I=1,9
           P(I,I,MP)=0.
4300    CONTINUE
           P(2,2,MP)=2.(NP2-2)-2.(NP2-5)
           P(3,3,MP)=2.(NP3-2)-2.(NP3-5)
           IF (IUP.EQ.KAL2) GO TO 4500
           P(1,1,MP)=2.(NP1-2)-2.(NP1-5)
           GO TO 6000
C
4400    IF (IUP.NE.KAL1) GO TO 4500
C       SWITCH IN P SUB A
           P(1,1,MP)=0.5*ZR/(1.-0.5)
           P(1,2,MP)=(2.14466*ZR/(1.-0.5))*2.**-NT
           GO TO 6000
C
4500    IF (IUP.NE.KAL2) GO TO 4600
C       SWITCH IN P SUB B
           P(1,1,MP)=(0.14800*ZR/(1.-0.148))*2.
           P(1,2,MP)=(0.19700*ZR/(1.-0.148))*2.**(2-NT)
           P(1,3,MP)=(0.08756*ZR/(1.-0.148))*2.**(3-2*NT)
           GO TO 6000
C
4600    IF (IUP.NE.(KALM-1)) GO TO 6000
C       SWITCH TO UNRESTRICTED P MATRIX(FULL KALMAN) MODE
           P(1,1,MP)=2.(NP1-2)-2.(NP1-5)
           P(1,2,MP)=0.
           P(1,3,MP)=0.
           P(1,1,2)=P(1,1,1)
           P(1,2,2)=0.
           P(1,3,2)=0.
           P(2,1,2)=0.
           P(2,2,2)=P(2,2,1)
           P(2,3,2)=0.
           P(3,1,2)=0.
           P(3,2,2)=0.
           P(3,3,2)=P(3,3,1)
```

```
       IUPASS(MP)=KALM
       ZE2=2.**12
       ZR=2.**12
       GO TO 6000
C
C      UNRESTRICTED P MATRIX(FULL KALMAN) MODE: EXTRAPOLATE P
C
 4700  CONTINUE
C
C      COMPUTE PNEW=PHI*POLD*PHI TRANSPOSE
       DELTA=UN-HTITC
       DELTA2=DELTA**2
       DO 4800 MP=1,2
       P(1,1,MP)=P(1,1,MP)+AK1*P(2,2,MP)+AK4*P(3,3,MP)+2.*(H*P(1,2,MP)+
      *        AK2*P(1,3,MP)+AK3*P(2,3,MP))
       P(1,2,MP)=P(1,2,MP)+H*P(1,3,MP)+AK1*P(2,3,MP)+AK1*P(2,3,MP)+
      *        H*P(2,2,MP)+AK3*P(3,3,MP)
       P(1,3,MP)=DELTA*(P(1,3,MP)+H*P(2,3,MP)+AK2*P(3,3,MP))
       P(2,2,MP)=P(2,2,MP)+AK1*P(3,3,MP)+2.*H*P(2,3,MP)
       P(2,3,MP)=DELTA*(P(2,3,MP)+H*P(3,3,MP))
       P(3,3,MP)=DELTA2*P(3,3,MP)
 4800  CONTINUE
       MP=MOD(NODEVN,2)+1
C
C      ADD ON PLANT NOISE TO PNEW
       ETA2=ETFAC2*UNITY
       ETA3H=ETFAC3
       IF (HTITC-H) 4900,5000,9000
 4900  ETA3F=ETFAC3*HTITC
       ETA3H=ETA3F/H
 5000  CONTINUE
       IF (KODEVN.NE.0) GO TO 5100
       ETA2=ETFAC2*2.**(2*IR)
 5100  CONTINUE
       BB(1,1)=ETA2*H33+ETA3H*H4D20
       BB(1,2)=ETA2*AK2+ETA3H*H3D8
       BB(1,3)=ETA3H*H223
       BB(2,2)=ETA2*H+ETA3H*H2D3
       BB(2,3)=ETA3H*H
       BB(3,3)=ETA3H
       DO 5500 II=1,3
       DO 5500 JJ=1,3
       IF (II.NE.3) GO TO 5300
       IF (JJ.NE.3) GO TO 5300
       PPLUSB=P(3,3,MP)+BB(3,3)
       IF (PPLUSB.LT.0.75*2.**NP3) GO TO 5300
       P(3,3,MP)=0.75*2.**NP3
 5300  CONTINUE
       P(II,JJ,1)=P(II,JJ,1)+BB(II,JJ)
       P(II,JJ,2)=P(II,JJ,2)+BB(II,JJ)
C      IF UNDERFLOW ALONG ANY DIAGONAL ELEMENT, REINITIALIZE P MATRIX
       IF (II.NE.JJ) GO TO 5400
       IF (P(II,JJ,1).GT.0.) GO TO 5400
       IF (P(II,JJ,2).GT.0.) GO TO 5400
       IUP=0
       GO TO 4100
 5400  CONTINUE
 5500  CONTINUE
C
 6000  CONTINUE
       IF (KODEVN.EQ.0) GO TO 7000
       IF (KODEVN.EQ.2) GO TO 7000
C
C      RANGE PASS, STATE UPDATE
C      RMEAS HAS BEEN READ IN PREVIOUSLY

DELR=(RMEAS-YRTEM)

ZZ=ZR
       DENOM=P(1,1,MP)+ZZ
       DO 6400 I=1,3
       UB(I)=S(1,I)/YR
       CPC(I)=P(1,I,MP)/DENOM
 6400  CONTINUE
       DO 6600 I=1,3
       BIGL=CPC(I)*DELR
       IF (IUP.LT.KALM) BIGL=BIGL*2.**((I-1)*NT-I)
       IF (IUP.LT.KAL2.AND.I.NE.3) BIGL=BIGL*2.**I
       DO 6600 J=1,3
       ULB(I,J)=UB(J)*BIGL
       S(I,J)=S(I,J)+ULB(I,J)
 6600  CONTINUE
C
       IF (IUP.LT.KALM) GO TO 8000
C
       GO TO 7600
C
C      ANGLE PASS, STATE UPDATE
C      EPSEX,EPSAX,PE,PA HAVE BEEN READ IN PREVIOUSLY

ESQRT = SQRT(EPSEX*EPSEX+EPSAX*EPSAX)
       EPLIM = .03
       IF(ESQRT.LT.EPLIM) EPOUT = ESQRT
       IF(ESQRT.GT.EPLIM) EPOUT = 2.*EPLIM-ESQRT
       IF(ESQRT.GT.(1.5*EPLIM)) EPOUT = 0.
       EPSEX = EPOUT*EPSEX/ESQRT
       EPSAX = EPOUT*EPSAX/ESQRT
       PSQRT = SQRT(PE*PE+PA*PA)
```

```
      IF(PSQRT.LT.EPLIM) PPOUT = PSQRT
      IF(PSQRT.GT.EPLIM) PPOUT = 2.*EPLIM-PSQRT
      IF(PSQRT.GT.(1.5*EPLIM)) PPOUT = 0.
      PE = PPOUT*PE/PSQRT
      PA = PPOUT*PA/PSQRT
      EPSEX = EPSEX-PE
      EPSAX = EPSAX-PA
C
 7000 CONTINUE
      ZZ=ZE1+ZE2*2.**(2*IR)
      DENOM=P(1,1,MP)+ZZ
      DO 7200 I=1,3
      VV(I)=(C2(I)*EPSAX-C3(I)*EPSEX)*YR
      XL(I)=P(1,I,MP)/DENOM
 7200 CONTINUE
      NSHIFT=1
      IF (IR.GE.4) NSHIFT=2
      IMX=2
      IF (IR.LT.3) IMX=3
      DO 7400 I=1,IMX
      DO 7400 J=1,3
      V(I,J)=VV(J)*XL(I)
      IF (IUP.LT.KALM) V(I,J)=V(I,J)*2.**((NT-NSHIFT)*(I-1)-NSHIFT)
      S(I,J)=S(I,J)+V(I,J)
 7400 CONTINUE
C
      IF (IUP.LT.KALM) GO TO 8000
C
C     P UPDATE
 7600 CONTINUE
      P(1,1,MP)=P(1,1,MP)*ZZ/DENOM

P(2,1,MP)=P(1,2,MP)*ZZ/DENOM
      P(3,1,MP)=P(1,3,MP)*ZZ/DENOM
      P(2,2,MP)=P(2,2,MP)-P(1,2,MP)**2/DENOM
      P(3,2,MP)=P(2,3,MP)-P(1,2,MP)*P(1,3,MP)/DENOM
      P(3,3,MP)=P(3,3,MP)-P(1,3,MP)**2/DENOM
      P(1,2,MP)=P(2,1,MP)
      P(1,3,MP)=P(3,1,MP)
      P(2,3,MP)=P(3,2,MP)
      P(2,1,MP)=0.
      P(3,1,MP)=0.
      P(3,2,MP)=0.
C
 8000 CONTINUE
      HTITC=H/3.5
      IF (IUP.LT.KALM) GO TO 8400
C     TTC = ARBITRARY COMPUTATION
      IF (TTC.GT.200.) TTC=200.
      HTITC=H
      IF (TTC.LT.32.) GO TO 8400
      HTITC=H*32./TTC
 8400 CONTINUE
C
      IF (IR.LT.3.AND.IUP.LT.1000.AND.IUP.GE.(KAL2+1)) IUP=IUP+1
      IF (IUP.LT.(KAL2+1)) IUP=IUP+1
      IUPASS(MP)=IUP
C
C
C     END OF SIMULATED AIRBORNE COMPUTATIONS
 9000 CONTINUE
      NODEVN = KODEVN+1
 3595 CONTINUE

C     WRITE DESIRED OUTPUT QUANTITIES
C     RETURN TO EXECUTIVE PROGRAM
      SUBROUTINE ORTHOG(K,ANGLE,U,KONVRT,T)

REAL A(3,3),U(3,3),T(3,3)
      IF(MOD(KONVRT,2).EQ.1) ANGLE = ANGLE*3.141592654/180.
      CANG = COS(ANGLE)
      SANG = SQRT(1.-CANG**2)
      IF(SIN(ANGLE).LT.0.) SANG = -SANG
      A(1,1) = CANG
      A(2,1) = 0.
      A(3,1) = 0.
      A(1,2) = 0.
      A(2,2) = CANG
      A(3,2) = 0.
      A(1,3) = 0.
      A(2,3) = 0.
      A(3,3) = CANG
      A(K,K) = 1.
      GO TO (100,200,300),K
```

```
100 A(2,3) = SANG
    A(3,2) = -SANG
    GO TO 400
200 A(3,1) = SANG
    A(1,3) = -SANG
    GO TO 400
300 A(1,2) = SANG
    A(2,1) = -SANG
400 CONTINUE
    L = MOD(KONVRT,4)
    IF(L.GT.1) GO TO 800
    DO 550 I = 1,3
    DO 550 J = 1,3
    T(I,J) = A(I,J)
550 CONTINUE
    GO TO 1000
800 CALL MATMT3(3,0,KONVRT/8, A,U,T)
1000 RETURN
    END
    SUBROUTINE MATMT3(L,A,U,T)
    REAL A(3,3),U(3,3),T(3,3),TTM(3)
    DO 30 I = 1,3
    DO 30 J = 1,L
    DO 20 K = 1,3
    TTM(K) = A(J,K)*U(K,J)
    T(I,J) = TTM(1)+TTM(2)+TTM(3)
30  CONTINUE
    RETURN
    END
    SUBROUTINE FVCOMP(S,SAA)
    COMMON/FVCMP1/TTCL,WVR,WVA,WAR,WAA
    DIMENSION FV(3,3),SAP(3),S(3,3),SAA(3)

C   INPUT ACCELERATION STATES, S(3,1),S(3,2),S(3,3)
C   INPUT KALMAN VELOCITY GAIN FACTORS IN RANGE,ANGLE, WVR,WVA
C   INPUT KALMAN ACCELERATION GAIN FACTORS IN RANGE,ANGLE, WAR,WAA
C   INPUT TARGET TIME CONSTANT,TTC
C   COMPUTE COMPENSATION FACTORS,FVMAR,FVMAA
C   COMPUTE COMPENSATION MATRIX, FV
C   MULTIPLY ACCELERATION STATES BY FV MATRIX
C   CORRECTED ACCELERATION STATES ARE SAA(1),SAA(2),SAA(3)

RPLUS2 = S(1,1)**2+S(1,2)**2+S(1,3)**2
    RPI2 = 1./RPLUS2
    IF(TTCL.LT.1.) TTCL = 1.
    IF(TTCL.GT.200./32.2) TTCL = 200./32.2
    FVMAR = WAR/(WAR+WVR/TTCL)
    FVMAA = WAA/(WAA+WVA/TTCL)
    FVMAL = FVMAA
    IF(FVMAA.LT..25) FVMAL = .25
    FVMRL = FVMAR
    IF(FVMAR.LT..25) FVMRL = .25
    SAP(1) = S(3,1)
    SAP(2) = S(3,2)
    SAP(3) = S(3,3)
    FVMPR = 1./FVMRL
    FVMPA = 1./FVMAL
    FV(1,1) = RPI2*(FVMPR*S(1,1)**2+FVMPA*(RPLUS2-S(1,1)**2))
    FV(1,2) = RPI2*S(1,1)*S(1,2)*(FVMPR-FVMPA)
    FV(1,3) = RPI2*S(1,1)*S(1,3)*(FVMPR-FVMPA)
    FV(2,1) = FV(1,2)
    FV(2,2) = RPI2*(FVMPR*S(1,2)**2+FVMPA*(RPLUS2-S(1,2)**2))
    FV(2,3) = RPI2*S(1,2)*S(1,3)*(FVMPR-FVMPA)
    FV(3,1) = FV(1,3)
    FV(3,2) = FV(2,3)
    FV(3,3) = RPI2*(FVMPR*S(1,3)**2+FVMPA*(RPLUS2-S(1,3)**2))
    CALL MATMT3 (1,FV,SAP,SAA)
    RETURN
    END
```

We claim:

1. A radar system for tracking a target comprising:
an antenna for repetitively sensing reflected radar pulses from the target,
means responsive to the reflected pulses to generate signals referenced to a line-of-sight coordinate system, including signals representative of measured range and measured angle of the target,
means governed by the measured range and angle signals for comparison with predictions based upon previously estimated values to generate residuals, including residuals representative of range and angle,
means to generate variable estimation gain factors to weight said residuals,
means to transform the product of gain factors and residuals from the line-of-sight coordinate system reference to a stable coordinate system reference,
estimating means including means governed by the product of the gain factors and residuals referenced to the stable coordinate system to generate vector component values, including values representative of estimated target range, and
means to transform the generated values representative of estimated target range to corresponding values referenced to the radar gimbal mechanical axis for positioning the antenna in accordance with the estimated target position.

2. A radar system according to claim 1 wherein the means to generate the estimation gain factors includes means to generate estimation covariance elements propagated in the line-of-sight coordinate system, whereby the number of covariance elements are minimized.

3. A radar system according to claim 1 wherein the stable coordinate system is geographic.

4. A radar system according to claim 1 wherein a gimballed antenna is mounted in an aircraft.

5. A system according to claim 1 wherein the estimating means further includes means governed by the product of the gain factors and residuals referenced to the stable coordinate system to generate vector component values representative of the position of the target and the velocity and the acceleration of the target relative to said stable coordinate system.

6. A system according to claim 1 wherein the line-of-sight coordinate system is substantially the antenna coordinate system.

* * * * *